US011365131B2

(12) United States Patent
Figola et al.

(10) Patent No.: US 11,365,131 B2
(45) Date of Patent: Jun. 21, 2022

(54) SYSTEMS AND METHODS FOR STORMWATER MANAGEMENT

(71) Applicant: Advanced Drainage Systems, Inc., Hilliard, OH (US)

(72) Inventors: Daniel J. Figola, Powell, OH (US); Bo Liu, Clarksburg, MD (US); Thomas E. Pank, Walkersville, MD (US); Ronald R. Vitarelli, Marlborough, CT (US); Erik K. Hartwell, Mount Airy, MD (US)

(73) Assignee: ADVANCED DRAINAGE SYSTEMS, INC., Hilliard, OH (US)

( * ) Notice: Subject to any disclaimer, the term of this patent is extended or adjusted under 35 U.S.C. 154(b) by 0 days.

(21) Appl. No.: 16/952,734

(22) Filed: Nov. 19, 2020

(65) Prior Publication Data

US 2021/0147254 A1    May 20, 2021

Related U.S. Application Data

(63) Continuation of application No. 16/837,010, filed on Apr. 1, 2020, now Pat. No. 10,882,759.

(Continued)

(51) Int. Cl.
*E03F 5/14* (2006.01)
*C02F 1/00* (2006.01)
(Continued)

(52) U.S. Cl.
CPC .............. *C02F 1/004* (2013.01); *B01D 23/16* (2013.01); *B01D 24/04* (2013.01); *B01D 24/167* (2013.01);
(Continued)

(58) Field of Classification Search
CPC .......... E03F 5/101; E03F 5/14; B01D 24/007; B01D 24/167; B01D 24/40; B01D 24/42
(Continued)

(56) References Cited

U.S. PATENT DOCUMENTS

| 4,107,044 A | 8/1978 | Levendusky |
| 4,895,645 A | 1/1990 | Zorich, Jr. |

(Continued)

FOREIGN PATENT DOCUMENTS

CH    298867 A    5/1954

OTHER PUBLICATIONS

International Search Report, from International Patent Application No. PCT/US2021/022354, dated Jun. 29, 2021.

*Primary Examiner* — Christopher Upton
(74) *Attorney, Agent, or Firm* — Finnegan, Henderson, Farabow, Garrett & Dunner, L.L.P.

(57) ABSTRACT

A fluid management system including an inlet configured to receive pre-processed fluid is provided. The system includes a filtering apparatus configured to remove contaminants from the pre-processed fluid. The filtering apparatus includes a plate having a first opening. A first manifold pipe is disposed on the plate and includes one or more perforations and a second opening at least partially aligned with the first opening. A second manifold pipe is disposed on the plate and includes one or more perforations. Filter media is disposed between the first manifold pipe and the second manifold pipe and is configured to separate the contaminants from the pre-processed fluid. The system also includes an outlet coupled to the second manifold pipe to receive processed fluid from the filtering apparatus.

20 Claims, 15 Drawing Sheets

Related U.S. Application Data

(60) Provisional application No. 62/992,820, filed on Mar. 20, 2020, provisional application No. 62/935,620, filed on Nov. 14, 2019.

(51) Int. Cl.
| | |
|---|---|
| *B01D 39/08* | (2006.01) |
| *B01D 24/00* | (2006.01) |
| *B01D 24/40* | (2006.01) |
| *B01D 24/42* | (2006.01) |
| *B01D 29/56* | (2006.01) |
| *B01D 24/04* | (2006.01) |
| *B01D 24/16* | (2006.01) |
| *C02F 103/00* | (2006.01) |

(52) U.S. Cl.
CPC ............ *B01D 24/40* (2013.01); *B01D 24/42* (2013.01); *B01D 29/56* (2013.01); *B01D 39/08* (2013.01); *E03F 5/14* (2013.01); *C02F 2103/001* (2013.01)

(58) Field of Classification Search
USPC ................................ 210/747.3, 170.03, 291
See application file for complete search history.

(56) References Cited

U.S. PATENT DOCUMENTS

| | | | |
|---|---|---|---|
| 5,707,527 A | 1/1998 | Knutson et al. | |
| 5,853,578 A | 12/1998 | Flyaks | |
| 6,077,423 A * | 6/2000 | Roy | E03F 5/14 |
| | | | 210/170.03 |
| 6,277,274 B1 * | 8/2001 | Coffman | E03F 1/002 |
| | | | 210/170.03 |
| 7,473,373 B1 * | 1/2009 | Danler | E03F 5/14 |
| | | | 210/170.03 |
| 8,658,044 B2 | 2/2014 | Cobb | |
| 10,260,222 B1 | 4/2019 | Happel | |
| 10,882,759 B1 * | 1/2021 | Figola | E03F 5/14 |
| 2007/0289908 A1 | 12/2007 | Williamson et al. | |
| 2008/0277326 A1 | 11/2008 | Hersey et al. | |
| 2015/0129473 A1 | 5/2015 | Kent | |

\* cited by examiner

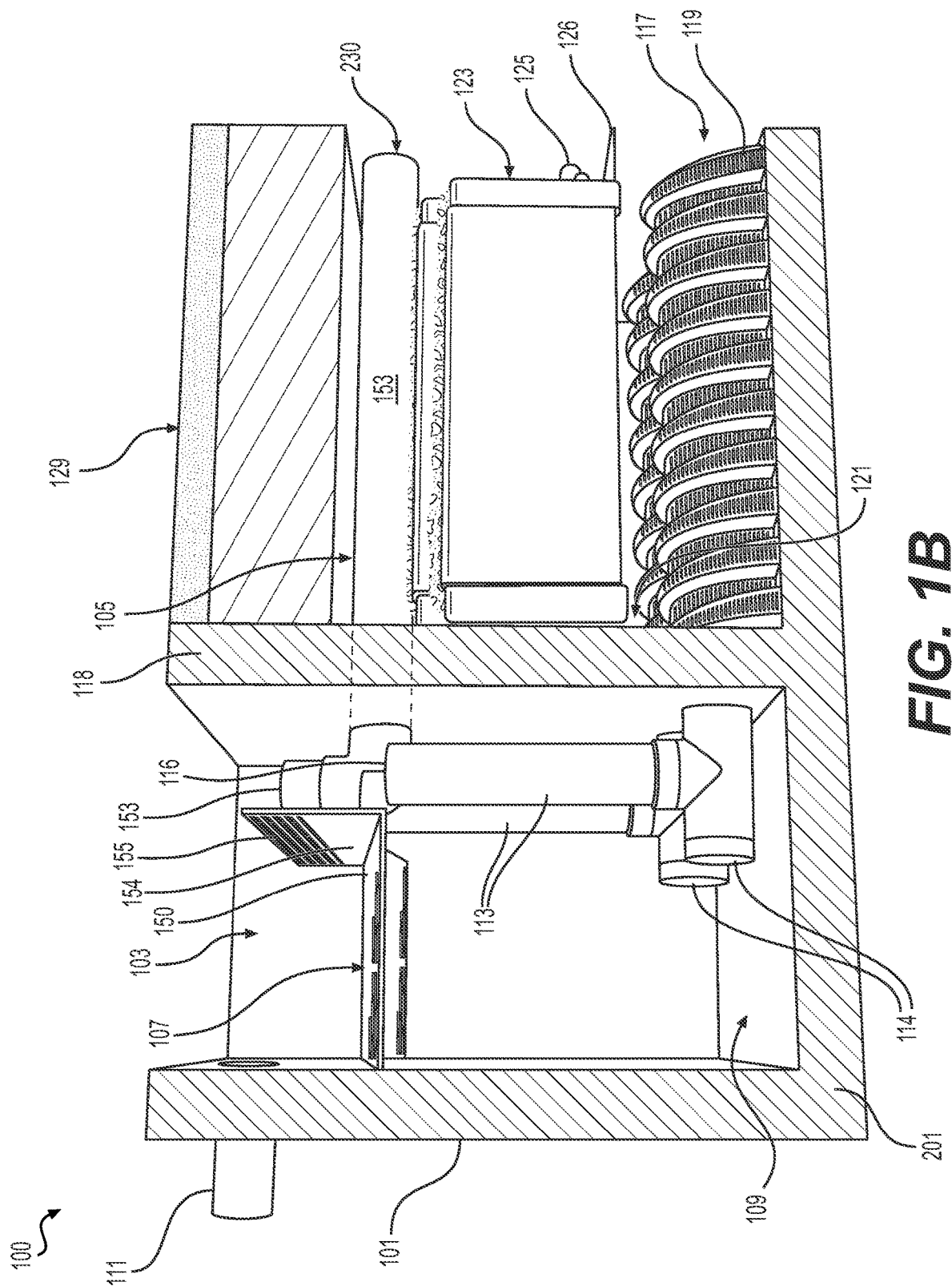

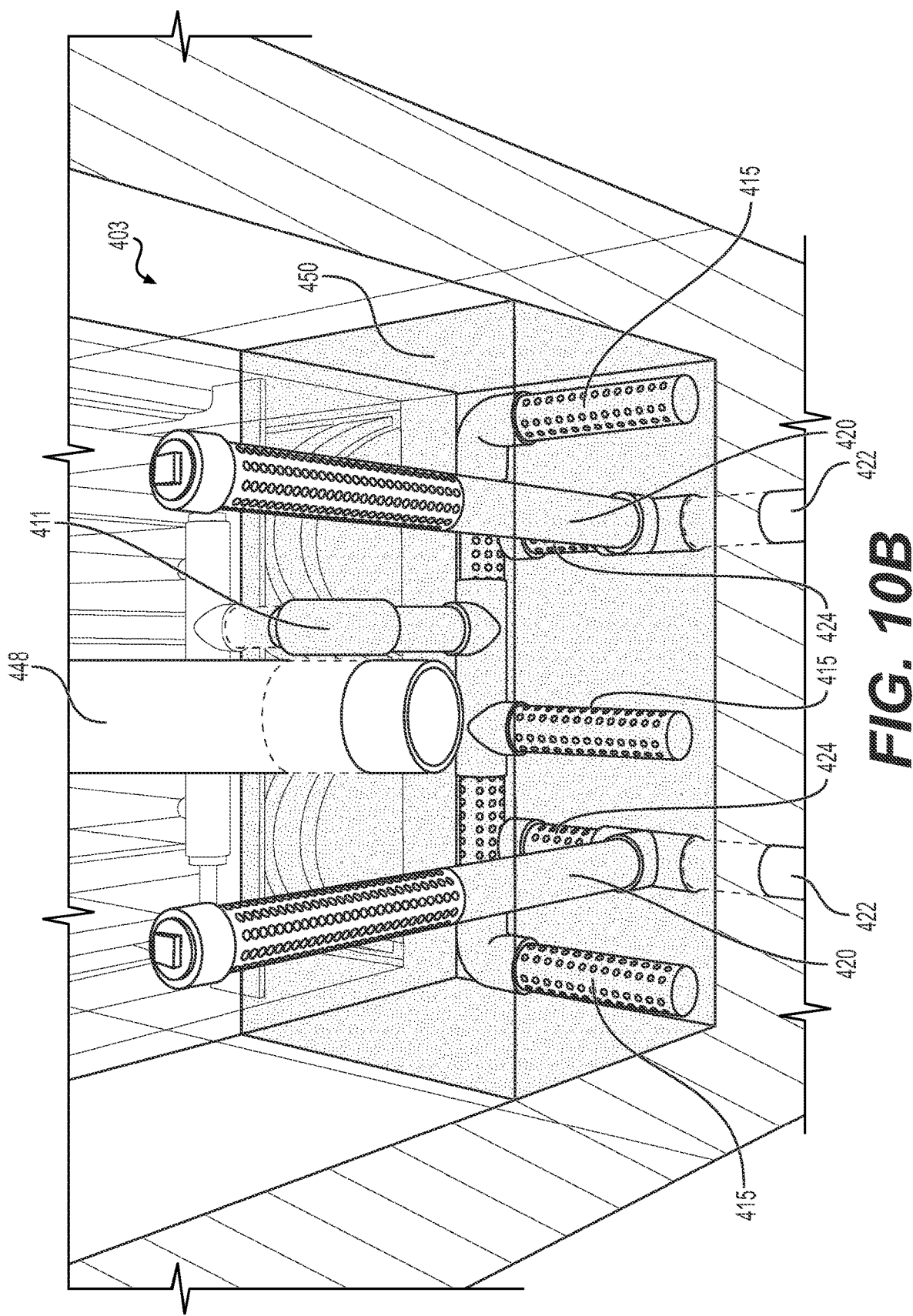

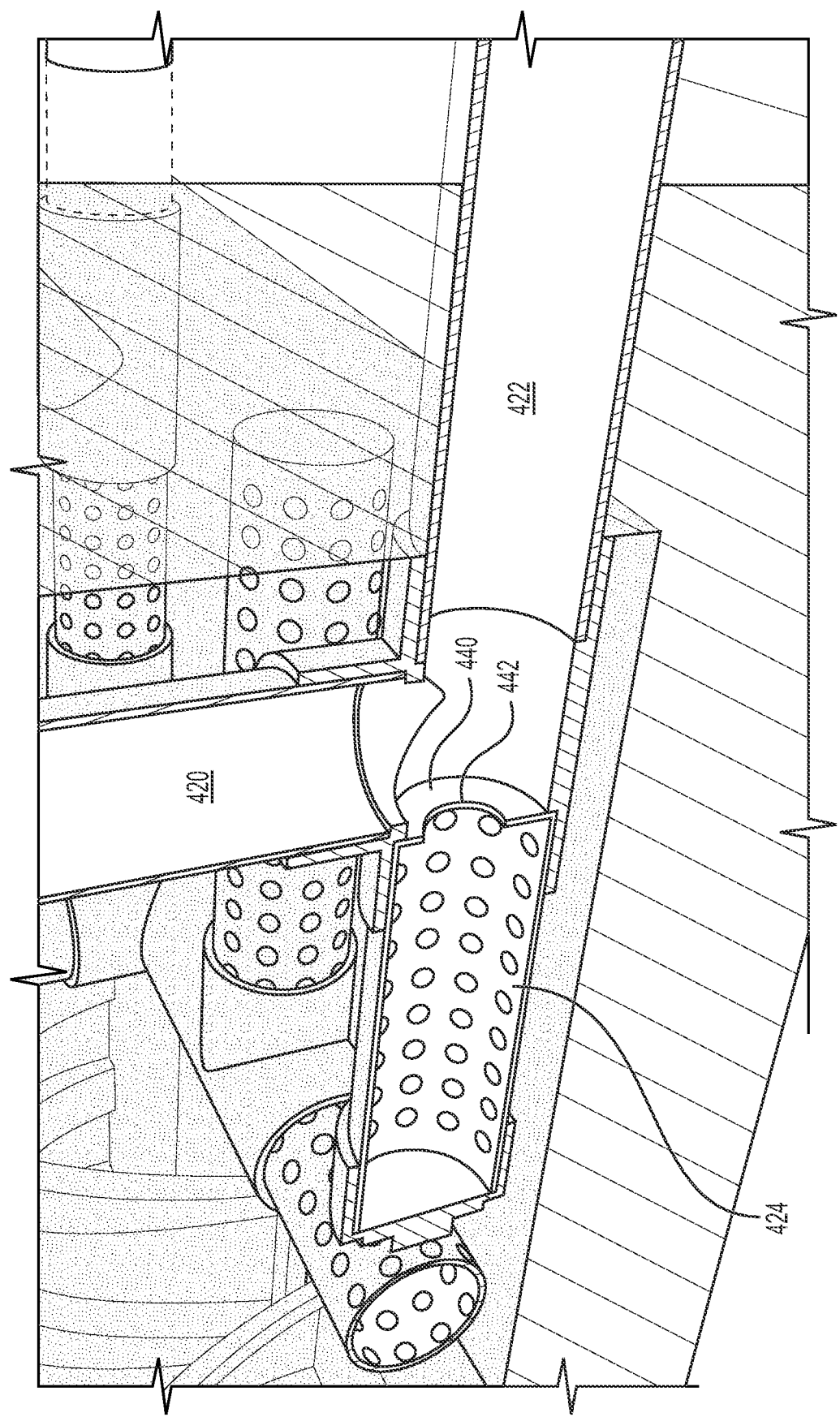

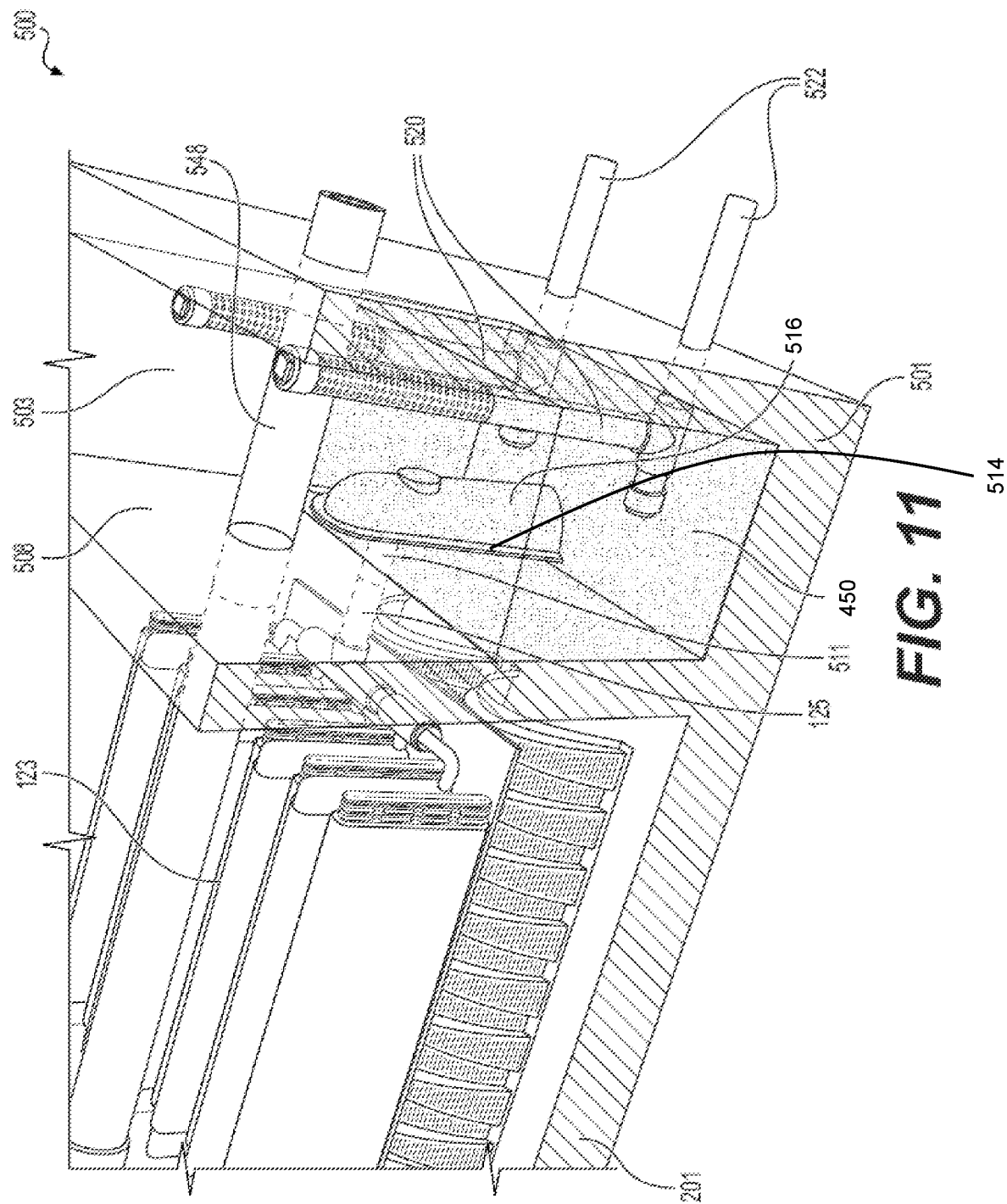

SYSTEMS AND METHODS FOR STORMWATER MANAGEMENT

RELATED APPLICATION DATA

This application is a continuation of application Ser. No. 16/837,010, filed Apr. 1, 2020, which claims priority to U.S. Provisional Patent Application No. 62/935,620, filed Nov. 14, 2019, titled "SYSTEMS, APPARATUS, AND METHODS USEFUL FOR STORMWATER MANAGEMENT AND BIOFILTRATION," and U.S. Provisional Patent Application No. 62/992,820, filed Mar. 20, 2020, titled "SYSTEMS, AND METHODS FOR STORMWATER MANAGEMENT," the entire disclosures of which are incorporated herein by reference.

FIELD

The disclosure generally relates to systems, apparatuses, and methods for managing rainwater, stormwater, and/or other fluid run-off and, more particularly, systems and methods for treating such fluids to remove contaminants and pollutants.

BACKGROUND

Rainwater, stormwater, and other fluid run-off management systems process rainwater or other fluid run-off on ground surfaces to separate sediment or other contaminants from the fluid. Such systems may be located at roadways, parking lots, filling stations, and other sites prone to rainwater, stormwater, sediment, trash, metals, and/or oil accumulation and/or flow. These systems may be used to process rainwater or stormwater by separating fluid from solid particles or providing filtration. However, existing systems may present certain drawbacks, for example, by producing a final fluid with a higher level of contaminants than may be desired. Accordingly, there exists a need for improved stormwater management systems and methods.

SUMMARY

In one embodiment, a fluid management system includes an inlet configured to receive pre-processed fluid and a filtering apparatus configured to remove contaminants from the pre-processed fluid. The filtering apparatus includes a plate having a first opening disposed therein and a first manifold pipe disposed on the plate and including one or more perforations and a second opening, the second opening being at least partially aligned with the first opening. A second manifold pipe is disposed on the plate and includes one or more perforations. Filter media is disposed between the first manifold pipe and the second manifold pipe and configured to separate the contaminants from the pre-processed fluid. An outlet is coupled to the second manifold pipe to receive processed fluid from the filtering apparatus.

In another embodiment, a filtering apparatus for a fluid management system is configured to remove contaminants from the pre-processed fluid. The filtering apparatus includes a plate having a first opening disposed therein. A first manifold pipe is coupled to the plate and includes one or more perforations and a second opening, the second opening corresponding to the first opening. A second manifold pipe is disposed on the plate adjacent to the first manifold pipe and includes one or more perforations. Filter media is disposed between the first manifold pipe and the second manifold pipe and configured to separate the contaminants from the pre-processed fluid.

In another embodiment, a fluid management system includes an inlet configured to receive pre-processed fluid and a diffusion plate configured to receive the pre-processed fluid and to direct the pre-processed fluid along either a bypass fluid flow path or a primary fluid flow path. A filtering apparatus is disposed in the primary fluid flow path, configured to receive at least a first portion of the pre-processed fluid from the diffusion plate, and configured to remove contaminants from the pre-processed fluid. The filtering apparatus includes a first manifold pipe having one or more perforations, a second manifold pipe disposed adjacent to the first manifold pipe and having one or more perforations, and filter media disposed between the first manifold pipe and the second manifold pipe. The filter media is configured to separate the contaminants from the at least a first portion of the pre-processed fluid. A bypass pipe is disposed in the bypass fluid flow path and configured to receive at least a second portion of the pre-processed fluid.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 1B illustrates a rear perspective view of the stormwater management system of FIG. 1A with portions of its housing removed, consistent with embodiments of this disclosure;

FIG. 10B illustrates a side, top perspective view of the stormwater management system of FIG. 10A with portions of its housing removed, consistent with embodiments of this disclosure;

FIG. 10C illustrates a detailed perspective cross-section view along line 10C-10C in FIG. 10A, with portions of its housing removed, consistent with embodiments of this disclosure; FIG. 11 illustrates a rear perspective view of another stormwater management system with portions of its housing removed, consistent with embodiments of this disclosure.

DETAILED DESCRIPTION

As discussed in further detail below, various embodiments of stormwater systems and methods are provided. Embodiments of the stormwater systems may include one or more features that enable a pre-processed fluid to be processed to reduce or eliminate one or more contaminants in the pre-processed fluid to produce a processed fluid. For example, an embodiment of the stormwater management system may include a filter apparatus having a manifold assembly designed to reduce or eliminate the pollutant content from the pre-processed fluid. The manifold assembly may include one or more features that enable greater surface contact between the pre-processed fluid and one or more filtering devices, as compared to traditional systems. For example, the manifold assembly may include wrapped pipes having filter media disposed therebetween. These and other features of the disclosed embodiments are discussed in more detail below.

Figure 1A:
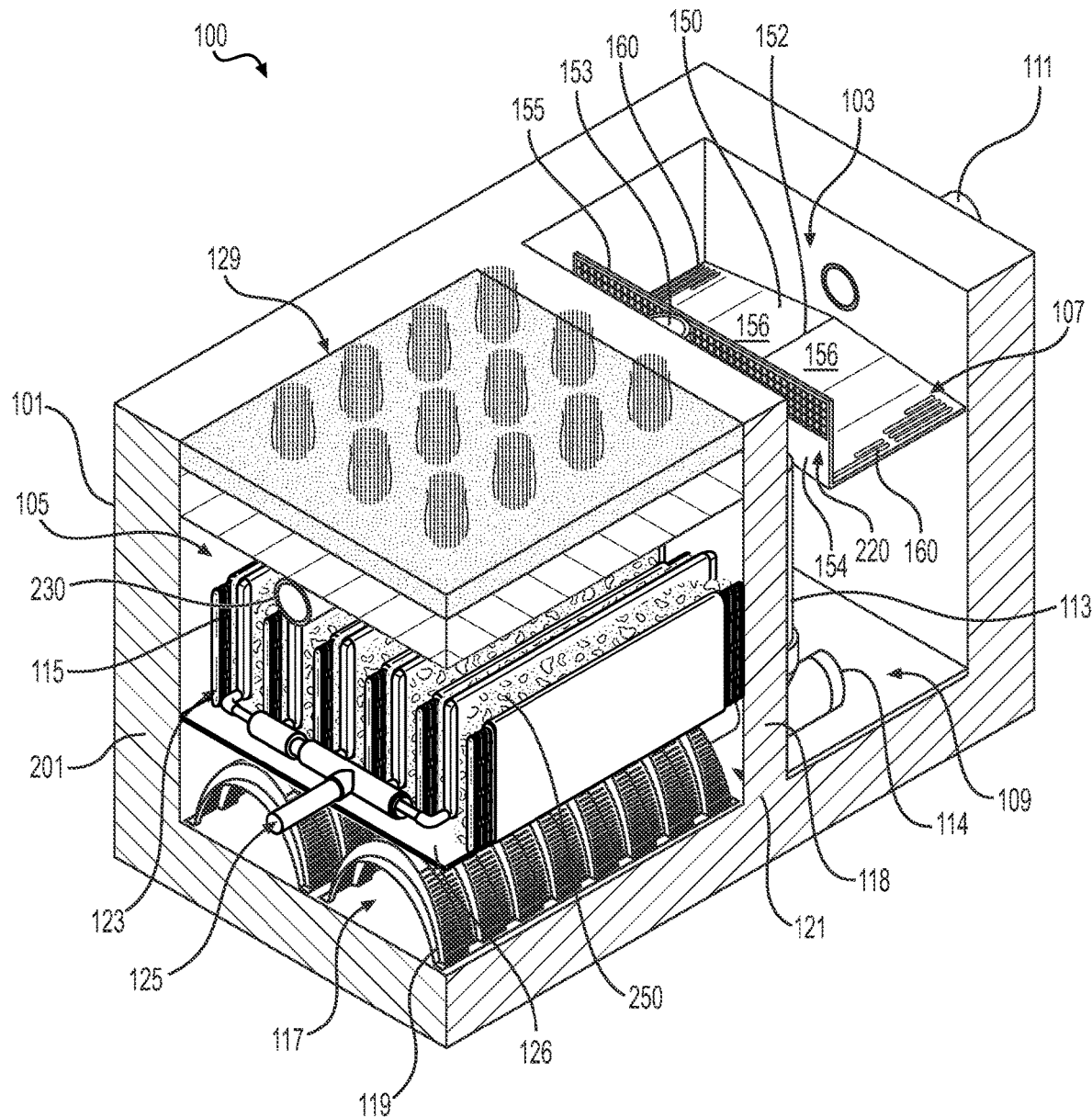
FIG. 1A illustrates a front, top perspective diagrammatical view of a stormwater management system with portions of its housing removed, consistent with embodiments of this disclosure.
Figure 1C:
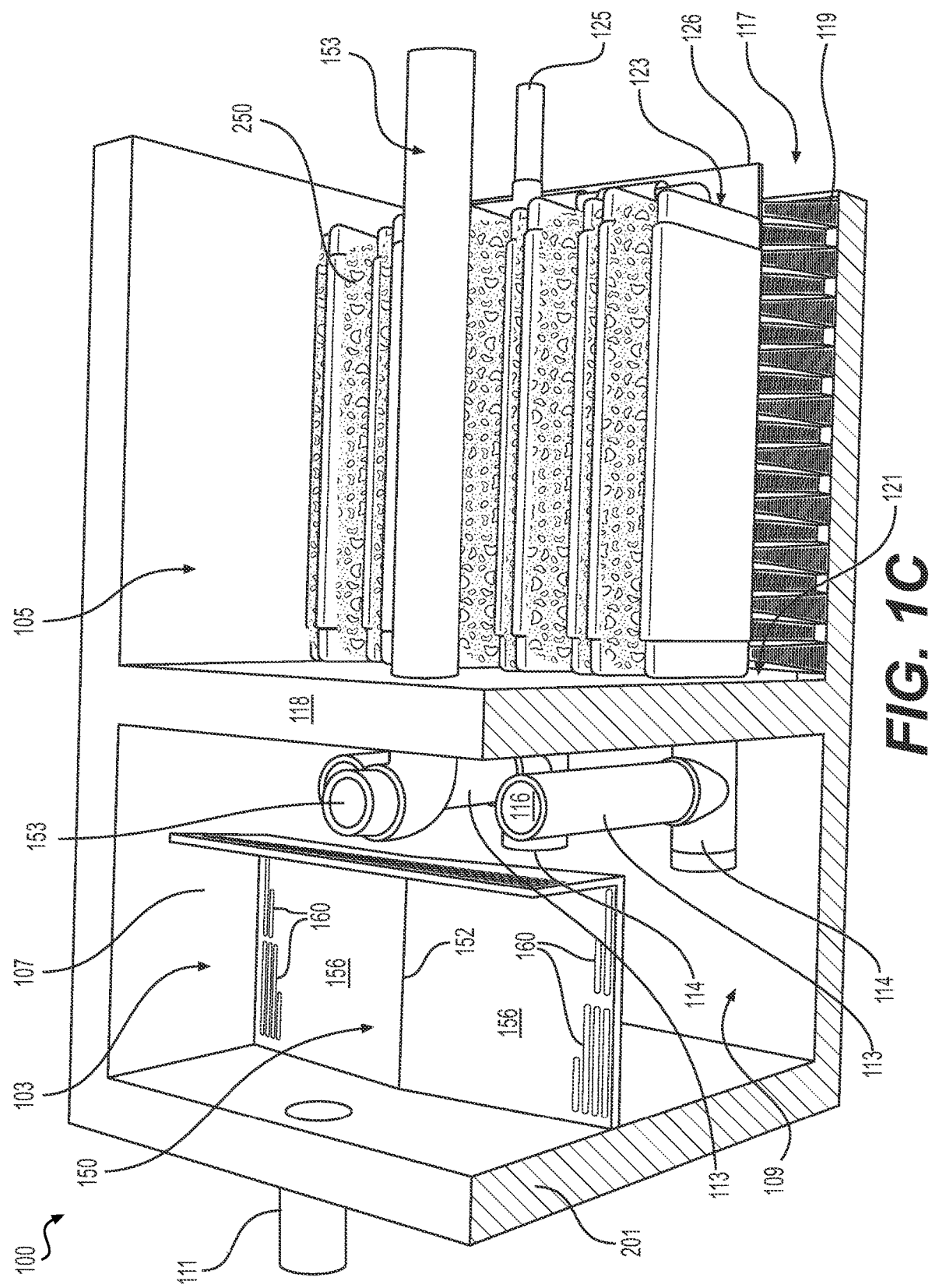
FIG. 1C shows a rear, top perspective view of the stormwater management system of FIG. 1A with portions of its housing removed, consistent with embodiments of this disclosure.

Turning now to the drawings, FIGS. 1A, 1B, and 1C illustrate an embodiment of a fluid (e.g., stormwater) management system 100 having portions of its housing removed for illustrative purposes. In particular, FIGS. 1A, 1B, and 1C show a fluid management system 100 including a separation and/or filtration apparatus 101 having a housing 201. Separation and/or filtration apparatus 101 includes a first chamber 103 and a second chamber 105. In operation, first chamber 103 could remain open on the top. In some embodiments, first chamber could be covered on the top by a portion of housing 201 not shown in FIGS. 1A-C for illustrative purposes. Further, in FIG. 1A, the front portion of first chamber 103 would also be enclosed by housing 201 during operation. Similarly, during use, second chamber 105 would be enclosed by housing 201, which has been removed for illustrative purposes only.

In some embodiments, the components of first chamber 103 and second chamber 105 are configured to cooperatively function to remove particles, sediment, and other material from a pre-processed fluid, such as stormwater, entering separation and/or filtration apparatus 101 via an inlet 111 to release a processed fluid with a reduced contaminant level from apparatus 101 via an outlet 125 and/or a bypass pipe 153 with outlet 230. Pre-processed fluid may enter filtration apparatus 101 through additional openings in housing 201. For example, pre-processed fluid may enter filtration apparatus 101 through a top opening in first chamber 103. Pre-processed fluid may also enter filtration apparatus 101 through additional openings in housing 201. To that end, in some embodiments, second chamber 105 may operate as a filtration chamber that receives and filters partially processed fluid from first chamber 103. First chamber 103 may be configured to separate certain contaminants from the pre-processed fluid entering apparatus 101.

In some embodiments, first chamber 103 includes an upper portion 107 and a lower portion 109. First chamber 103 also includes inlet 111 formed through an outer wall of housing 201 through which a pre-processed fluid may enter from outside housing 201. As depicted in FIG. 1B, for example, first chamber 103 may also include a pair of riser pipes 113, each riser pipe 113 connected to a pipe 114 extending into second chamber 105. In the illustrated embodiment, each riser pipe 113 includes an intake end 116 and an output end 121. Intake ends 116 may be positioned in upper portion 107 of first chamber 103 in some embodiments. Riser pipes 113 extend from their respective intake ends 116 to lower portion 109 of first chamber 103 in the illustrated embodiment. However, in other embodiments, the location or configuration of riser pipes 113 may be subject to implementation-specific variations.

In the illustrated embodiment, first chamber 103 also includes a diffusion plate 150. Diffusion plate 150 may be configured to be positioned in upper portion 107 of first chamber 103. Diffusion plate 150 may be configured to receive the pre-processed fluid from fluid inlet 111 and/or an opening in housing 201 such as an opening above first chamber 103, process the fluid, and direct it to other portions of apparatus 101. To that end, in the illustrated embodiment, diffusion plate 150 includes a horizontal axis 152 that lies parallel to a floor of first chamber 103 when installed in apparatus 101. In the illustrated embodiment, two diffusion surfaces 156 extend downward at an angle from horizontal axis 152 where diffusion surfaces 156 connect forming a central peak. Diffusion surfaces 156 may be angled downward and may include one or more slots 160 at or near the end of diffusion surfaces 156. In some embodiments, the degree of the angle of diffusions surfaces 156 may be subject to implementation-specific variations. In other embodiments, diffusion surfaces 156 may not be angled.

During operation, angled diffusion surfaces 156 may allow fluid and material passing into first chamber 103 to flow toward sides of first chamber 103. Slots 160 may permit passage of fluid through diffusion surfaces 156, while blocking larger materials such as solid refuse. In some embodiments, slots 160 may be symmetrical across the end of diffusion surfaces 156. In other embodiments, one side of each diffusion surface 156 may include more slots 160 than the other side. In a non-limiting example, the side of diffusion surface 156 closer to inlet 111 may include more slots 160 than the side of diffusion surface 156 closer to vertical surface 154. However, slots 160 are subject to implementation-specific changes from the embodiment shown in FIGS. 1A-C. For example, the quantity and/or shape of slots 160 may be any desired shape (e.g., ovular, circular, square, etc.) and/or quantity configured to filter the size and shape of the contaminants to be removed in a given implementation. During operation, the fluid processed through slots 160 of diffusion plate 150 may enter the inlet(s) of riser pipe(s) 113 for transfer to second chamber 105 for further filtering and particle separation, as described in more detail below.

In the illustrated embodiment, diffusion plate 150 also includes a vertical surface 154 extending from diffusion surfaces 156 toward the top of first chamber 103. Vertical surface 154 may include a first unperforated portion 220. During operation, unperforated portion 220 may direct incoming fluid down diffusion surfaces 156 toward slots 160. Vertical surface 154 may also include a perforated screen 155 that extends across some or all of the width of vertical surface 154 of diffusion plate 150. Perforated screen 155 may include a plurality of openings that may allow excess fluid from inlet 111 to pass through perforated screen 155. During operation, the excess fluid may be directed by diffusion plate 150 to a bypass pipe 153.

In the illustrated embodiment, bypass pipe 153 extends from an upper portion of first chamber 103, under vegetative bed 129 of second chamber 105, and ending at an outlet 230 from second chamber 105. Bypass pipe 153 may allow fluid to flow through fluid management system 100 without being treated other than passing through perforated plate 155. The bypassed fluid flowing through bypass pipe 153 may be disposed of via outlet 230 different from outlet 125. During operation, bypass pipe 153 may bypass fluid flow in excess of design treatment flows. Bypass pipe 153 may also enable excess fluid to exit the unit in instances where apparatus 101 has not been properly maintained leading to build-up and/or a reduced processing capacity.

Second chamber 105 includes an upper portion 115 and a lower portion 117. In the illustrated embodiment, riser pipes 113 extend from their respective intake ends 116 to lower portion 117 of first chamber 103 and through an interposing interior wall 118 to enable fluid flow to an interior space of second chamber 105 at bottom portion 117.

One or more separator membranes 119 may be located at bottom portion 117 of second chamber 105. In the embodiment shown in FIGS. 1A-C, separator membrane 119 rests on or is connected to a floor of bottom portion 117 of second chamber 105. Separator membrane 119 shown in FIGS. 1A-C has a hemi-circularly or arch shaped cross-section and rigid structure. Separator membrane 119 may include a corrugated structure having peaks and valleys. Separator membrane 119 may include slotted openings on sidewall portions of separator membrane 119 to allow passage of water or fluid received from output ends 121 of riser pipes 113. In some embodiments the slotted openings may extend completely from a foot of separator membrane 119 on one side over a crown of separator membrane 119 to a foot on the opposite side of separator membrane 119. In other embodiments the slotted openings may extend part way up the sidewall portions of separator membrane 119 and may terminate before reaching a crown of separator membrane 119. In some embodiments the peaks and valleys of separator membrane 119 may include slotted openings. In other embodiments either the peaks or valleys of separator membrane 119 do not include slotted openings. Output ends 121 may extend into an interior of second chamber 105 at bottom portion 117. During operation, flowing the fluid through riser pipes 113 and one or more separator membranes 119 may reduce or impede passage of macro-particles, thus providing a separation and gross filtration function.

In the illustrated embodiment, second chamber 105 includes a filter manifold apparatus 123 interposing top portion 115 and bottom portion 117. Filter manifold apparatus 123 may include a manifold configuration with filtering elements disposed in an alternating, side-standing arrangement, connected to an outlet 125. In some embodiments, the manifold configuration may include manifold inlets and manifold outlets in alternating pipes, as discussed in more detail below with respect to FIG. 5. The manifold outlets may be connected to outlet 125. During operation, the inlets and outlets permit passage of fluid from within second chamber 105 through filter manifold apparatus 123 and out outlet 125. The fluid flow path through the fluid management system 100 will be described in more detail in the discussion of FIGS. 3 and 4 below.

Figure 6:
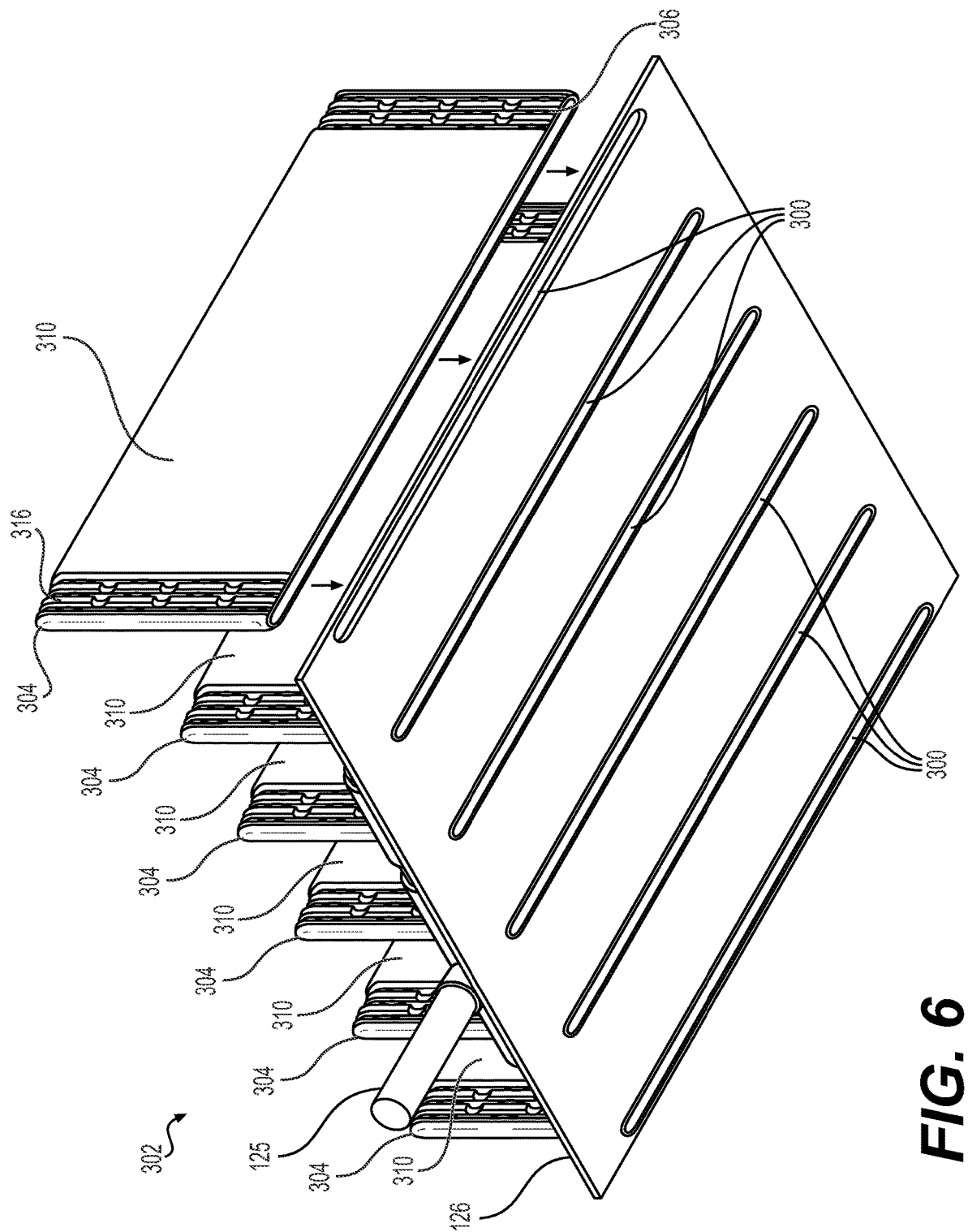
FIG. 6 illustrates a bottom perspective view of the filter apparatus of FIG. 5.

The manifold inlets and outlets of filter manifold apparatus 123 may be, for example, constructed of thermoplastic panel drains that are perforated to allow passage of fluid (e.g. water). In some embodiments, a manifold of the filter manifold apparatus 123 in the form of a pipe is open on a bottom side thereof (see e.g. FIG. 6) where the filter manifold apparatus 123 is attached to a plate 126. In one embodiment, plate 126 may be formed from a thermoplastic material.

In some embodiments, filter media 250 may be disposed through the filter manifold apparatus 123. For example, filter media 250 may be arranged between the manifolds of filter manifold apparatus 123 and/or between separator membrane 119 and the filter manifold apparatus 123 below plate 126. As used herein, the term "filter media" refers to any filtering devices or material designed to remove particulates or contaminants from the fluid flow. For example, rocks, sand, or other materials and combinations thereof useful for fluid filtration may be used alone or in combination to form filter media 250. Filter media 250 may include filter sand (e.g., pool filter sand), perlite, alumina (e.g., activated alumina), combinations thereof, or any other material that may be effective to remove contaminants, such as phosphorous, nitrogen, bacteria, other metals, and/or total suspended solids ("TSS"). For example, filter media 250 may be selected and configured for processing water yielded from stormwater runoff processed by the fluid management system 100. In other embodiments, filter media 250 may include zeolite, and the filter media 250 may be used to remove bacteria (e.g. *E. coli*). Further, filter media 250 may have a first filter combination and a second filter combination. The first filter combination may include filter media 250, and may include sand (e.g., pool filter sand), perlite, alumina (e.g., activated alumina), combinations thereof, or any other material that may be effective to remove contaminants, such as phosphorous, and/or total suspended solids ("TSS"). The second filter combination may include filter media effective for removal of metals, bacteria (e.g. *E. coli*), or combinations thereof, and the second filter media may include zeolite. In some embodiments, the second combination of filter media may be positioned downstream of the first combination of filter media.

In some embodiments, biofilter 129 is disposed at upper portion 115 of second chamber 105. Biofilter 129 may provide a space for planting vegetation. In some embodiments, biofilter 129 may also provide for the use of the vegetation and bed it is planted in to filter rainwater that passes through the top of second chamber 105. In some embodiments, while biofilter 129 provides a filtering function, the biofilter 129 may be positioned away from a main pathway of fluid passing through second chamber 105 originating from first chamber 103.

Accordingly, in some embodiments, although biofilter 129 is incorporated into fluid management system 100, the biofilter is not positioned in a pathway of fluid flowing from first chamber 103 to second chamber 105. Rather, biofilter 129 includes vegetation planted in a vegetative bed located above the filter manifold apparatus 123, separate from the fluid pathway beginning in first chamber 103. Fluid flowing from first chamber 103 to second chamber 105 approaches filter manifold apparatus 123 from bottom portion 117 of second chamber 105. In some embodiments, fluid separately flows from a surface of the biofilter 129, through the vegetative bed, and into an interior of second chamber 105 before entering filter manifold apparatus 123. In other embodiments, however, fluid does not flow through the biofilter 129 into filter manifold apparatus 123.

Figure 2:
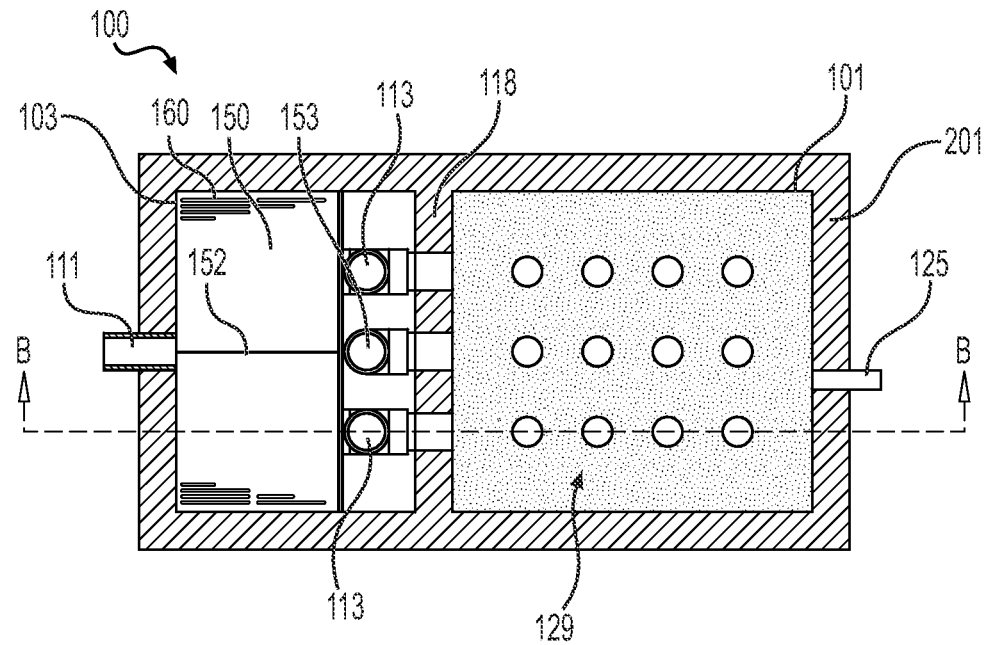
FIG. 2 shows a top diagrammatical view of the stormwater management system of FIG. 1A with portions of its housing removed, consistent with embodiments of this disclosure.
Figure 3:
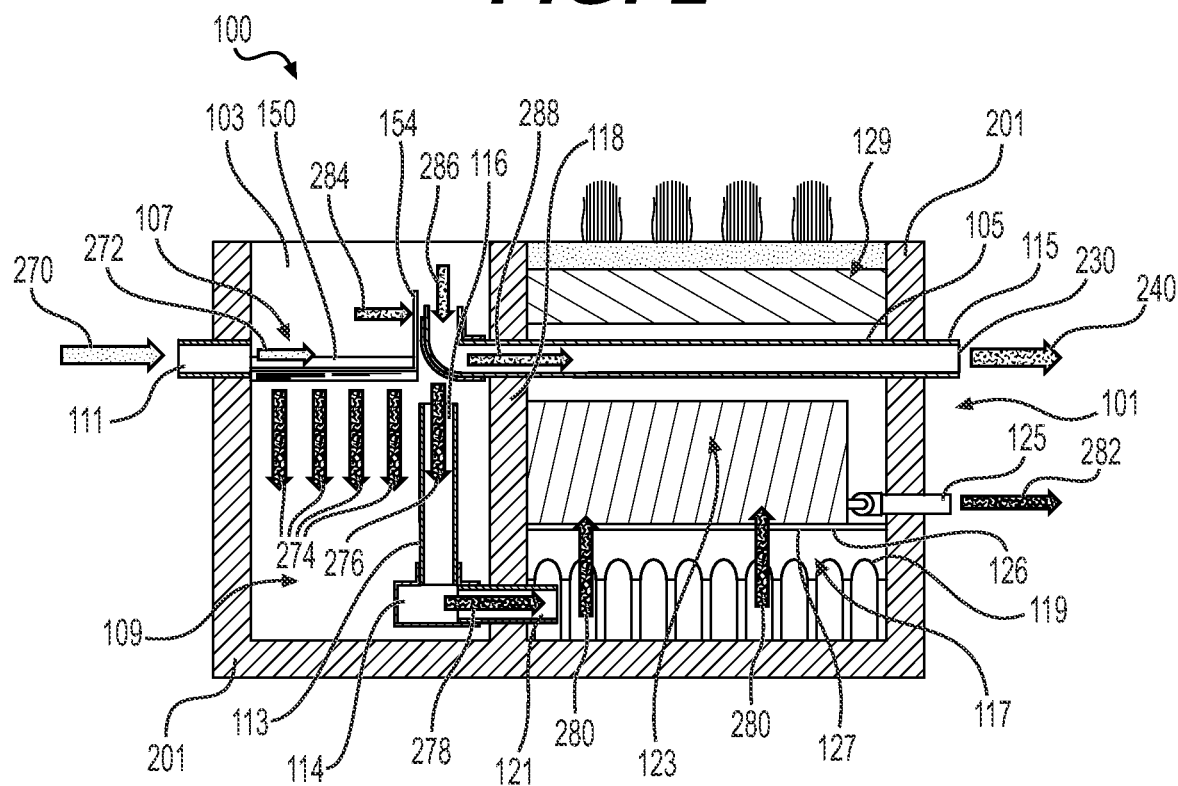
FIG. 3 shows a side diagrammatical cross-sectional view for the B-B cross-section of FIG. 2.
Figure 4:
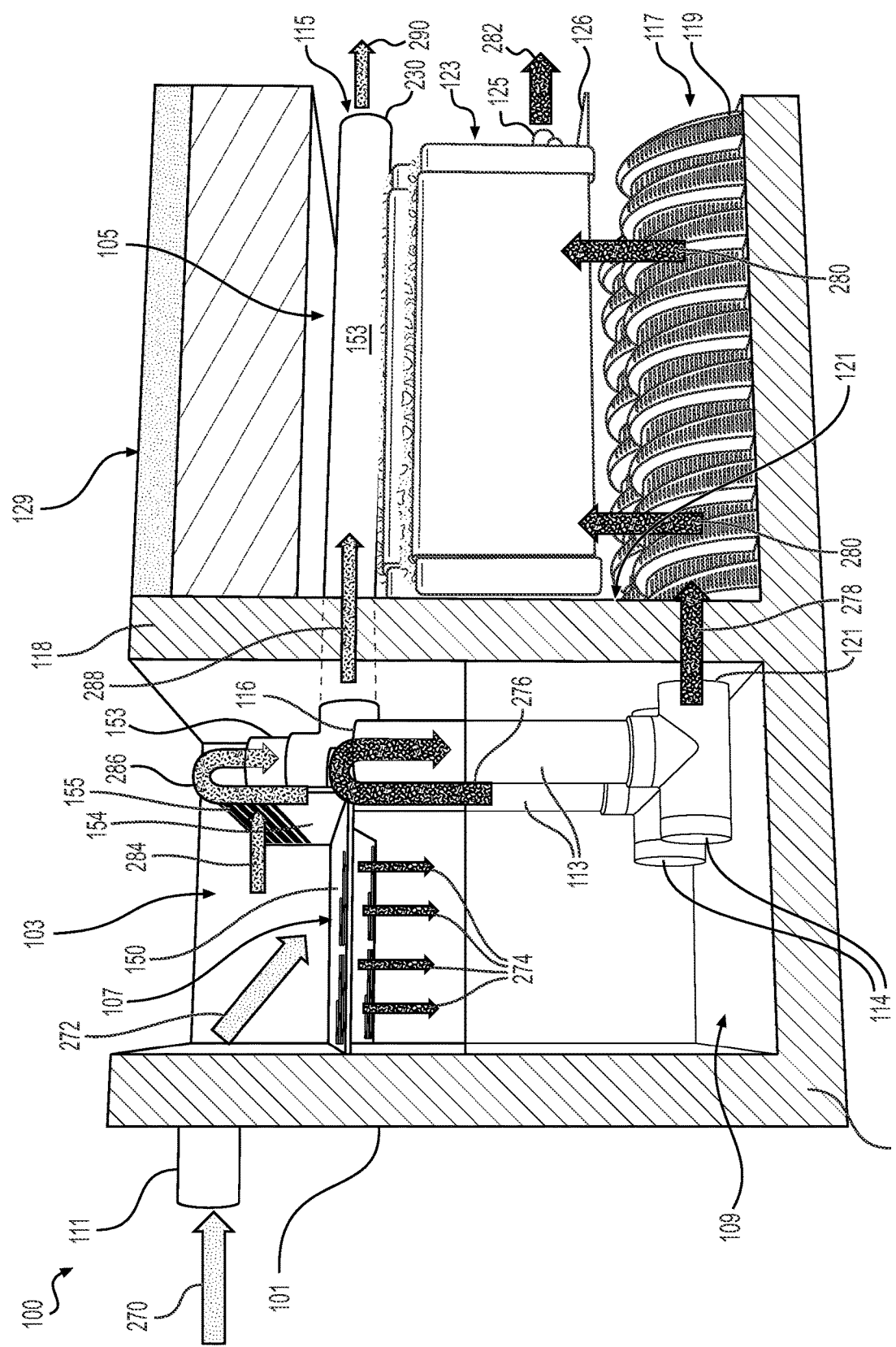
FIG. 4 illustrates example fluid flow paths through the stormwater management system of FIG. 1A, consistent with embodiments of this disclosure.

FIGS. 2-4 show additional views of the stormwater management system of FIGS. 1A-C. In particular, FIG. 2 illustrates a top diagrammatical view of fluid management system 100. As shown in this embodiment, first chamber 103 includes inlet 111, diffusion plate 150, and riser pipes 113. FIG. 2 also shows biofilter 129 disposed at the upper portion of second chamber 105. In some embodiments, biofilter 129 provides a space for planting vegetation, while also providing for the use of the vegetation and bed it is planted in to filter rainwater that passes through the top of second chamber 105.

FIG. 3 illustrates a side diagrammatical cross-sectional view for the B-B cross-section of FIG. 2 illustrating exemplary fluid flow paths through fluid management system 100. Likewise, FIG. 4 is a perspective view that illustrates fluid flow paths through the system. As shown, pre-processed fluid enters fluid management system 100 via inlet 111, as shown by arrow 270, and/or fluid may enter fluid management system via an opening in housing 201 such as an opening above first chamber 103, and contacts diffuser plate 150, as shown by arrow 272. The pre-processed fluid then takes either a first flow path or a second flow path to become either primary fluid flow or bypass fluid flow. The primary fluid flow results in a filtered fluid output via outlet 125. The bypass fluid flow results in a non-filtered fluid output via outlet 153, as it has passed through perforated plate 155 but not filter manifold apparatus 123.

Once it enters fluid management system 100 via inlet 111, the primary fluid flow passes into the upper portion 107 of first chamber 103. The primary fluid flow contacts diffusion plate 150 and flows through slots 160, as indicated by arrows 274. The primary fluid flow may contact diffusion surfaces 156 and/or non-perforated surface 154 of diffusion plate 150. It may then flow along one or both of diffusion surfaces 156 and pass through diffusion plate 150 via slots 160 to enter lower portion 109 of first chamber 103.

After passing through diffusion plate 150, the primary fluid flow begins to fill lower portion 109 of first chamber 103. After the primary fluid flow sufficiently fills lower portion 109, the primary fluid flow reaches the level of the pair of intake ends 116 and enters riser pipes 113 via the respective intake ends 116, as shown by arrow 276.

The primary fluid flow flows through riser pipes 113 and exits riser pipes 113 via output ends 121 that exit lower portion 109 of first chamber 103, as shown by arrow 278. Output ends 121 extend into an interior of second chamber 105 at bottom portion 117. The primary fluid flow may enter separator membrane 119, as illustrated by arrows 280, where contaminants are separated and filtered from the fluid. Separator membrane 119 may include slotted openings peaks and/or valleys of a corrugated surface of separator membrane 119, the slotted openings being formed therein to allow passage of the primary fluid flow received from output ends 121.

In the illustrated embodiment, the primary fluid flow then enters filter manifold apparatus 123 from the bottom of the apparatus via openings 300 (see FIG. 6) in plate 126. As illustrated, plate 126 may define openings 300 that correspond with openings in a bottom of portions of filter manifold apparatus 123, thereby allowing fluid flow to enter filter manifold apparatus 123. In one embodiment, the fluid may flow from the manifold inlets (i.e. openings 300) to the manifold outlet 125 by head pressure of the fluid through filter manifold apparatus 123. The fluid flows through filter manifold apparatus 123 into outlet 125 to exit the system, as shown by arrow 282.

The bypass fluid flow path may be utilized when fluid flow through inlet 111 is greater than fluid management system 100 can process via the primary fluid flow path, for example, due to larger than anticipated flows and/or a unit that has not been maintained to operate at full capacity. In some embodiments, fluid may enter a bypass fluid flow path when fluid entering in first chamber 103, as shown by arrows 270 and 272, begins to flow over vertical surface 154 or through perforated region 155 of diffusion plate 150. Accordingly, bypass fluid flow 190 may pass through perforated screen 155, as shown by arrow 284, and enter bypass pipe 153, as shown by arrow 286. Flow through bypass pipe 153 may extend from an upper portion of first chamber 103 and through second chamber 105, as indicated by arrow 288, to exit the unit via outlet 230, as indicated by arrow 290. Accordingly, bypass pipe 153 may allow fluid to flow through fluid management system 100 without treatment, and the fluid through bypass pipe 153 may be disposed of via outlet 290 different from outlet 125.

Figure 5:
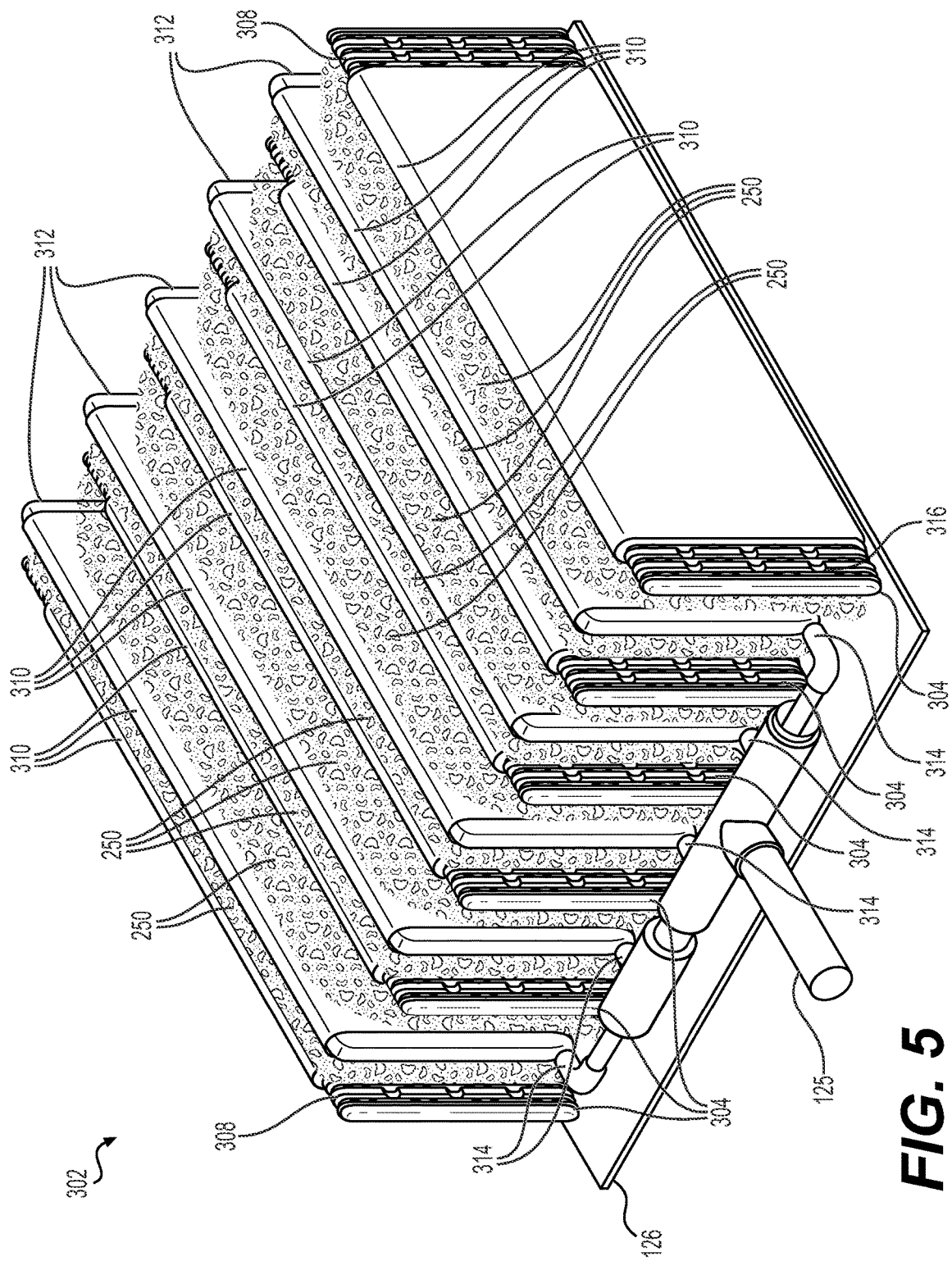
FIG. 5 is a perspective view of a filter apparatus including a manifold assembly, consistent with embodiments of this disclosure.

FIG. 5 illustrates an embodiment of filter manifold apparatus 123 including a manifold assembly 302. Portions of the manifold assembly 302 are shown in more detail in FIG. 6 with other portions of the manifold assembly 302 removed for illustrative purposes. As shown, manifold assembly 302 includes plate 126 having openings 300 disposed therein. In the illustrated embodiment, a first plurality of manifold pipes 304 include a plurality of open ends 306 configured to partially or fully align with openings 300 in plate 126 to allow the passage of fluid through plate 126 and into manifold pipes 304. The first plurality of manifold pipes 304 may be coupled to plate 126 via any securement mechanism, such as via a weld. The first plurality of manifold pipes 304 may also include a plurality of closed ends 308. Further, each of the first plurality of manifold pipes 304 may be formed from a porous material capable of allowing fluid to flow to the interior of each manifold pipe 304, for example through perforations 316.

In the illustrated embodiment of FIG. 5, manifold assembly 302 also includes a second plurality of manifold pipes 312. The second plurality of manifold pipes 312 are not shown in FIG. 6 for illustrative purposes only. As shown, each of the second plurality of manifold pipes 312 is coupled to a pipe 314 that provides fluid to outlet 125. Each of the second plurality of manifold pipes 312 may be formed from a porous material (e.g., a perforated material) capable of allowing fluid to flow to the interior of each manifold pipe 312. Further, each of the plurality of second manifold pipes 312 may be coupled to plate 126 via any suitable securement mechanism, such as a weld.

In the illustrated embodiment, each of the first manifold pipes 304 and the second manifold pipes 312 includes a wrap 310 disposed around at least a portion of each of the manifold pipes 304 or 312. Wrap 310 may be formed from any material suitable for collecting filtered water, such as fabric, woven geotextile, non-woven geotextile, polyester fabric, thermoplastic mesh, among other materials. In some embodiments, manifold pipes 304, 312 may be wrapped in a porous geotextile to reduce or eliminate the possibility that filter media 250 will enter into the manifold perforations. In some embodiments, manifold pipes 304, 312 are not wrapped.

Further, as described in detail above, filter media 250 may be disposed between alternating manifold pipes 304, 312 to provide filtration as the fluid progresses through manifold assembly 302.

It should be noted that although six pipes are illustrated in the first plurality of manifold pipes 304, in other embodiments, any suitable number of manifold pipes 304 may be provided, including only one manifold pipe 304. Similarly, although five pipes are illustrated in the second plurality of manifold pipes 312, in other embodiments, any suitable number of manifold pipes 312 may be provided. Further, it should be noted that manifold assembly 302 may be subject to implementation-specific variations. For example, in some embodiments, no filter media 250 may be present between first manifold pipes 304 and second manifold pipes 312. Indeed, in some embodiments, first manifold pipes 304 and second manifold pipes 312 may be spaced close enough to one another that no filter media 250 is present.

It should be noted that, although not illustrated, a plurality of rods may be provided to extend through the first plurality of manifold pipes 304 and the second plurality of manifold pipes 312. The plurality of rods may extend perpendicularly through the first plurality of manifold pipes 304 and the second plurality of manifold pipes 312, connecting each of the manifold pipes 304, 312 in the manifold assembly 302. The plurality of rods may be secured at opposite ends of the manifold assembly 302 to respective outermost first manifold pipes 304. In some embodiments, the plurality of rods may be secured to respective outermost first manifold pipes 304 on each end with end caps connecting each end of the plurality of rods to an outer surface of the respective outermost first manifold pipes 304.

In some embodiments, the plurality of rods may include a set of upper rods and a set of lower rods that extend through manifold pipes 304, 312 in respective positions away from plate 126. The set of upper rods may be positioned closer to the plurality of closed ends 308 than the plate 126, and the set of lower rods may be positioned closer to the plate 126 than to the plurality of closed ends 308. The upper set of rods and lower set of rods may each include any suitable number of rods positioned along the length of manifold pipes 304, 312. In a non-limiting example, the set of upper rods may include three rods and the set of lower rods may include three rods. In another non-limiting example, the set of upper rods may include two rods and the set of lower rods may include two rods. In still other examples, the upper set of rods and the lower set of rods may include the same number of rods or different numbers of rods. Further, the plurality of rods may include additional sets of rods or the plurality of rods may be positioned at irregular positions throughout the manifold pipes 304, 312.

It should be noted that, although not illustrated, a plurality of spacers may be positioned between each of the first plurality of manifold pipes 304 and the second plurality of manifold pipes 312 along each of the plurality of rods. The plurality of spacers may have a hollow internal chamber that may be configured to receive one of the plurality of rods therethrough. The plurality of rods may extend through the hollow internal chamber of the plurality of spacers that are positioned between each of the first plurality of manifold pipes 304 and the second plurality of manifold pipes 312. A spacer may be positioned between each first manifold pipe 304 and second manifold pipe 312 on each rod that extends therebetween. In addition to perforations 316, each manifold pipe 304, 312 may include a plurality of indentations (not shown) configured to receive the plurality of spacers, such that the spacers may nest into and create an interference fit with the indentations of the manifold pipes 304, 312.

In the embodiment illustrated in FIG. 5, although six pipes are illustrated in the first plurality of manifold pipes 304, in other embodiments, any suitable number of manifold pipes 304 may be provided, including only one manifold pipe 304. Similarly, although five pipes are illustrated in the second plurality of manifold pipes 312, in other embodiments, any suitable number of manifold pipes 312 may be provided. In such an example, any suitable number of spacers may be provided. For example, four upper rods may be provided, and four lower rods may be provided, and each rod may include ten (10) spacers. The ten spacers for each rod may be positioned between each first manifold pipe 304 and second manifold pipe 312. Although ten spacers per rod has been described, any suitable number of spacers per rod may be provided.

The combination of rods and spacers may provide advantageous stability and spacing between manifold pipes 304, 312 in manifold assembly 302. The combination of rods and spacers may provide additional control of the space between manifold pipes 304, 312 occupied by filter media 250. The combination of rods and spacers may assist in providing a consistent volume for filter media 250 to occupy between each of manifold pipes 304, 312.

During operation of the illustrated embodiment, fluid enters manifold assembly 302 from the bottom of plate 126 via openings 300 and flows into first manifold pipes 304 via openings 306. The fluid then flows through the perforations 316 in first manifold pipes 304 and through wrap 310. The fluid then enters filter media 250 before being absorbed by wraps 310 on second manifold pipes 312 and entering second manifold pipes 312 via perforations thereon (not shown). The fluid collected in second manifold pipes 312 then exits filter manifold assembly 123 via pipes 314 and outlet 125.

One or more features of manifold assembly 302 may offer advantages over existing filtration systems. For example, by using manifold pipes 304 and 312 with wraps 310, the manifold assembly may enable the fluid to be distributed over a larger surface area before entering the filter media 250 for processing. The wraps 310 may be porous to allow fluid flow. The foregoing feature may enable greater surface filtration as compared to systems not using a manifold assembly 302. In some embodiments, manifold pipes 304, 312 may include corrugations, which further increase surface area for fluid filtration.

Moreover, in addition to filter media 250 disposed in manifold assembly 302, additional filter media 250 may be arranged between filter manifold assembly 123 and separator membrane 119. For example, rocks, sand, or other materials and combinations thereof useful for fluid filtration may be placed between filter manifold apparatus 123 and separator membrane 119. For example, the filter media may be selected and configured for processing water yielded from stormwater runoff processed by fluid management system 100.

EXAMPLE

The following example is provided as an exemplary, non-limiting, testing example for the fluid management system 100 described herein.

Test Setup

The testing system included source tanks, a feed pump, a flow control valve, a flow meter, a background sample port, a screw-auger sediment doser, and a filtration system, e.g. system 100.

Testing Procedure

The water source was potable water obtained from an onsite tap. Municipal tap water was used to fill the source tanks, and then pumped to the system 100. Flow rate was controlled to the target of 60 gallons per minute (gpm) by a flow control valve. An inline flow meter measured and recorded the flow rate at one-minute intervals. Approximately four feet upstream of the system inlet, sediment was introduced to the feed stream via a dosing port; dosing rate was controlled by a screw-auger volumetric feeder with a ½ horsepower variable speed motor. The dosing rate was calculated to deliver an amount of sediment that, when mixed with the water from the source tank, would produce influent water with a target 200 mg/L test sediment concentration.

The feed flow entered system 100 via inlet 111 and began to fill the first chamber 103. Once the water level reached the top of riser pipes 113 in first chamber 103, water began to flow to second chamber 105 and flow through filter media 250, driven by hydrostatic head. A standpipe indicated the water head level. The treated water exited system 100 via outlet 125.

The effective filtration treatment area/loading rate is 1.0 gpm/ft$^2$, and the ratio of effective sedimentation area to effective filtration treatment area is 0.5. The ratio of wet volume to effective filtration treatment area is 1.2 ft.

Sample Collection

The grab sampling method was used for all sample collection by sweeping a wide-mouth 1-L plastic bottle through an openly flowing stream, to ensure the full cross section of the flow was sampled. The start time for each run was recorded.

The sampling schedule is provided in Table 1. The detention time for system 100 is 7 minutes. After initiating and stabilizing the flow rate at the maximum treatment flow rate (MTFR) and beginning sediment feed, effluent sampling did not begin until the filtration manufactured treatment devices (MTD) had been in operation for a minimum of three detention times.

Background water samples were collected upstream of the doser and dosing port in correspondence with the odd-numbered effluent samples (i.e., Samples E1, E3, E5 at t=27, 57, 87 minutes).

Two evenly-spaced drawdown samples, DDA and DDB, were taken after the flow and sediment feed to the unit had been stopped.

Sediment sample rates were measured using a stopwatch and mass measurement once at the very beginning of the run and twice more during the run. The duration of each run was 89 minutes.

TABLE 1

Sampling Schedule

| Time (min) | Sample(s) | Time (min) | Sample(s) |
|---|---|---|---|
| 0 | S1 | 59 | S3 |
| 27 | E1, BG1 | 87 | E5, BG5 |
| 28 | E2 | 88 | E6 |
| 29 | S2 | 89 | Stop Flow |
| 57 | E3, BG3 | N/A | DDA |
| 58 | E4 | N/A | DDB |

NOTE:
S = sediment rate;
E = effluent;
BG = background;
DD = drawdown

A sealed chain-of-custody form was completed at the conclusion of each run to reflect the transfer of samples between labs and to denote the sample collection date and time. Each person taking or relinquishing possession of the samples was required to sign a chain of custody form before samples changed hands.

Water temperature was recorded every minute by a data logger placed in first chamber 103. The water level in second chamber 105 was recorded every five (5) minutes by visual observation of an externally mounted manometer. Run and sampling times were measured using a digital timer and a stopwatch.

Test Sediment

Figure 7:
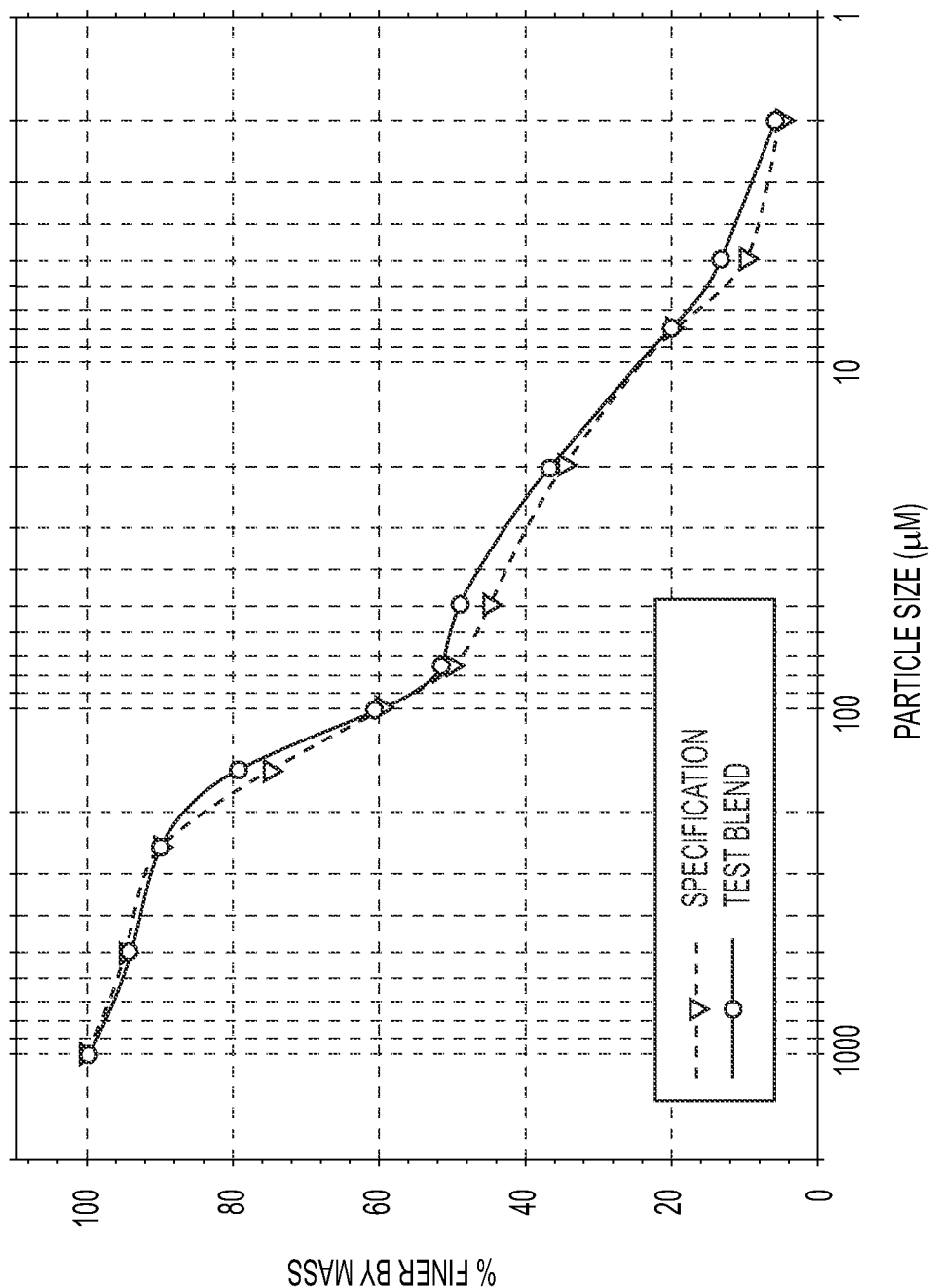
FIG. 7 illustrates the average particle size distribution of test sediment, consistent with embodiments of this disclosure.

The test sediment had the particle size distribution (PSD) presented in FIG. 7. The test blend used was custom-blended using various commercially available silica sands. The blend ratio of those sands was determined such that the size distribution of the resulting blended sediment would specifications. FIG. 7 shows the test sediment particle size distribution plotted against the values of the test blend used, which was sampled using the methodology of ASTM method D422-63.

The PSD test results are also summarized in Table 2. Results showed that 19-20% of the test sediments were less than 8 μm and 89-90% of the test sediments were less than 250 μm. The median size particles $d_{50}$ values (approximately 61 μm) also indicated that there was no significant difference between the target gradation and the verified gradation of the test sediment. Thus, the blended test sediment was found to meet the particle size specification and was acceptable for use. Sediment samples were also analyzed for moisture. The average moisture content was less than 0.1%.

TABLE 2

Particle Size Distribution of Test Sediment as Analyzed

| Particle Size (μm) | Test Blend % Finer by Mass Analyzed | | | | Specification (minimum % passing) |
|---|---|---|---|---|---|
| | Blend A | Blend B | Blend C | Average | |
| 1000 | 99.6 | 99.6 | 99.5 | 99.6 | 98 |
| 500 | 94.3 | 94.2 | 93.9 | 94.1 | 93 |
| 250 | 90.2 | 90.1 | 89.6 | 90.0 | 88 |
| 150 | 79.3 | 79.2 | 78.5 | 79.0 | 73 |
| 100 | 59.9 | 61.1 | 60.6 | 60.5 | 58 |
| 75 | 50.7 | 52.4 | 51.0 | 51.4 | 48 |
| 50 | 48.2 | 50.3 | 48.3 | 48.9 | 43 |
| 20 | 36.4 | 36.6 | 36.6 | 36.6 | 33 |
| 8 | 19.6 | 20.0 | 19.7 | 19.8 | 18 |
| 5 | 13.2 | 13.3 | 13.2 | 13.2 | 8 |
| 2 | 5.8 | 5.5 | 5.8 | 5.7 | 3 |

Sediment Removal Efficiency Testing

Sediment removal efficiency testing adhered to the guidelines set forth in for the protocol for filtration MTDs. The target flow rate through the system was 60 gpm, with a target sediment concentration of 200 mg/L. All samples were collected in clean, 1-L wide-mouth bottles. Three background samples were taken at 27, 57 and 87 minutes after the test began to ensure the tap water source met the sediment concentration requirement. According to the filter protocol, these background concentrations cannot exceed a TSS of 20 mg/L.

The test sediment screw-auger feeder (i.e. doser) introduced the test sediment into the feed water stream to achieve the target influent TSS concentration of 200 mg/L. According to the filter protocol, this influent concentration must stay within 10% of target, allowing for a 180 mg/L to 220 mg/L influent concentration. The doser was calibrated prior to each run. In order to confirm sediment feed rates during the test, in accordance with the filter protocol, three samples of the test sediment were collected from the doser injection point into a clean one-liter container for verification of sediment feed rate, over an interval timed to the nearest second, with a minimum volume of 0.1 liter or a collection interval not exceeding one minute (whichever came first). The time was kept with a stopwatch. The samples were weighed to the nearest milligram. The sediment feed rate coefficient of variance (COV) for the test sediment samples did not exceed 0.10. The mass from the sediment feed rate measurement samples was subtracted from the total mass introduced to the system when removal efficiency was calculated.

Effluent sampling was performed by the grab sampling method during each run, according to the schedule in Table 1. When the test sediment feed was interrupted for test sediment measurements, the next effluent samples were collected after at least three detention times had elapsed. During the drawdown period, two evenly spaced effluent samples were collected after flow and sediment feed had stopped. All sediment concentration samples were analyzed using the ASTM D3977-97 (re-approval 2007) "Standard Test Methods for Determining Sediment Concentrations in Water Samples."

Sediment Mass Loading Capacity

The sediment mass loading capacity testing occurred as a continuation of the removal efficiency testing, with the target for influent concentration remaining at 200 mg/L, and all aspects of testing procedures kept the same to ensure consistency throughout. The sediment mass loading capacity of the system 100 was defined as the cumulative mass loading of the unit at the end of the test run during which the maximum driving head was reached while operating at 54 gpm (90% of MTFR). In this testing program, the system 100 reached maximum driving head (36 inches) at 60 gpm (100% of MTFR) during Run 21. The feed flow rate was then reduced to 54 gpm (90% of MTFR), and testing continued until the maximum driving head was reached once again (Run 26).

Scour Testing

Scour testing was performed to demonstrate that the system 100 can be located on-line. The test was performed at an average feed flow rate of 111.2 gpm (185% of the MTFR). In accordance with the filter protocol, the average effluent concentration during the scour run must be less than 20 mg/L above the background concentration.

Scour testing was performed on the same system 100 unit used for removal efficiency and mass loading capacity testing, after all of that testing was complete. Thus, the scour test took place on a unit that had already been pre-loaded with 100% of the manufacturer's recommended maximum sediment storage volume (determined by mass loading capacity testing).

The scour testing commenced by gradually introducing and increasing clear water into the test unit until the flow rate stabilized at 111 gpm (five minutes). Effluent samples were collected utilizing the Effluent Grab Sampling Method every two minutes afterward. Fifteen effluent samples were collected in clean, 1-L bottles. Flow rate was recorded every minute.

Eight background samples were collected at the same time as the odd-numbered effluent samples (first, third, fifth, etc.). All samples collected (background and effluent) were analyzed for TSS according to ASTM D3977-97 (re-approval 2007) "Standard Test Methods for Determining Sediment Concentrations in Water Samples." In accordance with the filter protocol, all background concentrations must be less than 20 mg/L.

All effluent sample results from the scour test run were adjusted by subtracting the background concentration from the recorded effluent sample concentration.

Performance Claims

Total Suspended Solids (TSS) Removal Efficiency: Based on the laboratory testing conducted, system 100 achieved 87.4% cumulative TSS removal efficiency.

Maximum Treatment Flow Rate (MTFR): The system 100 unit has an MTFR of 0.13 cfs (60 gpm) and a filtration surface area (FSA) of 60 ft$^2$ (loading rate=1.0 gpm/ft$^2$).

Detention Time and Volume: The system 100 (e.g. 4'×8' unit) wet volume is 56.2 ft$^3$, and the detention time is about 7 minutes at the test flow rate of 60 gpm.

Effective Treatment/Sedimentation Area: the Effective Sedimentation Area (ESA) increases as the size of the system 100 unit increases, with a large-scale system having a higher ESA. Under test conditions with a single 4'×8' unit, the ESA and the ratio ESA/FSA were 30 ft2 and 0.5, respectively.

Sediment Load Capacity: Based on laboratory testing results, the system 100 unit has a mass loading capacity of 221 lbs.

Maximum Allowable Inflow Drainage Area: Laboratory testing results show that 221 lbs of sediment can be loaded into a 4'×8' system 100 unit with internal bypass, while achieving a cumulative sediment mass removal efficiency of 87.4%. Per the filter protocol, to calculate the maximum inflow drainage area, the total sediment load observed during the test (221 lbs) is divided by 600 lb/acre. Thus, the maximum inflow drainage area is 0.37 acres.

Testing Results

A total of 26 removal efficiency testing runs were completed in accordance with the filter protocol. The target flow rate and influent sediment concentration were 60 gpm and 200 mg/L, respectively. The results from all 26 runs were used to calculate the overall cumulative removal efficiency of the system 100.

Flow Rate

Flow rate was recorded by a flow meter every minute during each run. For each run, the flow rate was maintained within 10% of the target flow rate (54-66 gpm at 100% MTFR, and 48.6-59.4 gpm at 90% MTFR). The average flow rate for the first 21 runs (100% MTFR) was 59.5 gpm. The average flow rate for runs 22 through 26 (90% of MTFR) was 53.3 gpm. The flow data with coefficient of variation (CoV) values for all 26 runs are summarized in Table 3.

Water Temperature

Temperatures were recorded every minute by a HOBO water level logger (U20L-04). On average for all runs #1-26, the water temperature during testing was 55.5 degrees Fahrenheit, with a maximum of 59.5 degrees Fahrenheit, meeting the filter protocol requirement to be below 80 degrees Fahrenheit. Data are summarized in Table 3.

TABLE 3

Flow Rate & Temperature Summary for All Runs

| Run # | Max Flow (gpm) | Min Flow (gpm) | Average Flow (gpm) | Flow CoV | Flow Compliance (CoV < 0.1) | Maximum Temperature (Fahrenheit) | Temperature Compliance (<80 F.) |
|---|---|---|---|---|---|---|---|
| 1 | 62.13 | 58.40 | 61.10 | 0.0120 | Y | 56 | Y |
| 2 | 62.40 | 60.53 | 61.15 | 0.0067 | Y | 55 | Y |
| 3 | 60.27 | 58.93 | 59.34 | 0.0046 | Y | 55 | Y |
| 4 | 60.27 | 58.67 | 59.14 | 0.0061 | Y | 56 | Y |
| 5 | 60.27 | 58.67 | 59.24 | 0.0051 | Y | 56 | Y |
| 6 | 60.53 | 58.93 | 59.51 | 0.0038 | Y | 57 | Y |
| 7 | 60.00 | 59.20 | 59.50 | 0.0026 | Y | 58 | Y |
| 8 | 60.27 | 58.93 | 59.55 | 0.0036 | Y | 57 | Y |
| 9 | 60.27 | 58.93 | 59.49 | 0.0036 | Y | 56 | Y |
| 10 | 60.25 | 58.91 | 59.43 | 0.0041 | Y | 56 | Y |
| 11 | 60.53 | 58.67 | 59.46 | 0.0042 | Y | 60 | Y |
| 12 | 60.00 | 57.87 | 59.38 | 0.0046 | Y | 58 | Y |
| 13 | 60.00 | 58.67 | 59.37 | 0.0036 | Y | 58 | Y |
| 14 | 60.00 | 58.93 | 59.36 | 0.0032 | Y | 58 | Y |
| 15 | 60.00 | 58.93 | 59.38 | 0.0029 | Y | 58 | Y |
| 16 | 60.00 | 58.93 | 59.44 | 0.0035 | Y | 56 | Y |
| 17 | 60.25 | 59.18 | 59.49 | 0.0033 | Y | 56 | Y |
| 18 | 60.53 | 59.20 | 59.57 | 0.0035 | Y | 58 | Y |
| 19 | 60.27 | 58.67 | 59.35 | 0.0043 | Y | 57 | Y |
| 20 | 60.00 | 58.67 | 59.31 | 0.0034 | Y | 57 | Y |
| 21 | 59.20 | 58.13 | 58.64 | 0.0039 | Y | 57 | Y |
| 22 | 54.13 | 53.07 | 53.56 | 0.0027 | Y | 57 | Y |
| 23 | 54.12 | 52.78 | 53.43 | 0.0040 | Y | 56 | Y |
| 24 | 53.87 | 52.80 | 53.09 | 0.0044 | Y | 55 | Y |
| 25 | 54.93 | 52.80 | 53.23 | 0.0062 | Y | 56 | Y |
| 26 | 53.87 | 52.80 | 53.22 | 0.0047 | Y | 56 | Y |

Head

The head level in the second cell of the system 100 unit was recorded to the nearest ⅛ inch every five minutes, through visual observation of an externally-mounted manometer. With each run, the head during the run increased slightly over that of the previous run, until reaching the maximum (36 inches) in run 21. Beginning with run 22, the flow rate was reduced to 90% MTFR (54 gpm), and thus the maximum head decreased by about 3 inches from run 21 to run 22. The head then progressively increased again with each successive run, until once again reaching the maximum during Run 26. Maximum head for each run is summarized in Table 4.

TABLE 4

Maximum Head (inches) for All Runs

| Run # | Maximum Head (inches) |
|---|---|
| 1 | 25.125 |
| 2 | 27 |
| 3 | 27.375 |
| 4 | 27.875 |
| 5 | 28.625 |
| 6 | 28.875 |
| 7 | 29.75 |
| 8 | 30 |
| 9 | 30.375 |
| 10 | 30.875 |
| 11 | 30.5 |
| 12 | 31.5 |
| 13 | 31.625 |
| 14 | 32.375 |
| 15 | 32.875 |
| 16 | 33.5 |
| 17 | 34 |
| 18 | 34.125 |
| 19 | 35 |
| 20 | 35.375 |
| 21 | 35.875 |
| 22 | 32.5 |
| 23 | 33.25 |
| 24 | 33.5 |
| 25 | 35.625 |
| 26 | 36.25 |

Sediment Concentration and Removal Efficiency

Background TSS

Municipal tap water was used as the water source during testing. Overall, the average background TSS concentration was 0.91 mg/L, which is far below the 20 mg/L protocol limit. Background TSS concentrations for each run are provided in Table 5. The average background TSS value for each run was subtracted from effluent and drawdown values to provide adjusted figures.

TABLE 5

| | Background TSS Concentrations | | | | |
|---|---|---|---|---|---|
| Run # | Background TSS (mg/L) | Background TSS Compliance (<20 mg/L) | Run # | Background TSS (mg/L) | Background TSS Compliance (<20 mg/L) |
| 1 | 0.8 | Y | 14 | 0.5 | Y |
| 2 | 0.5 | Y | 15 | 0.5 | Y |
| 3 | 0.5 | Y | 16 | 0.5 | Y |
| 4 | 0.5 | Y | 17 | 0.5 | Y |
| 5 | 0.7 | Y | 18 | 0.5 | Y |
| 6 | 0.5 | Y | 19 | 0.5 | Y |
| 7 | 0.5 | Y | 20 | 0.5 | Y |
| 8 | 0.5 | Y | 21 | 0.7 | Y |
| 9 | 0.5 | Y | 22 | 0.5 | Y |
| 10 | 0.5 | Y | 23 | 0.5 | Y |
| 11 | 0.5 | Y | 24 | 0.7 | Y |
| 12 | 0.5 | Y | 25 | 1.5 | Y |
| 13 | 0.5 | Y | 26 | 8.7 | Y |
| | MEAN Background TSS (mg/L) | | | 0.9 | Y |

Sediment Dosing Rate and Influent TSS

Influent TSS concentration was calculated from the average measured sediment dosing rate and the average feed water flow rate for each run. The average influent TSS was 201 mg/L, with individual run averages ranging from 187 to 214 mg/L. All values are within the target range of 200±20 mg/L. Tables 6, 7 and 8 provide the measured sediment rates for each run, and the resulting calculated influent TSS concentration. In these tables, protocol compliance is defined as a TSS concentration in the range 180-200 mg/L and a CoV <0.1.

TABLE 6

| | Sediment Rate Measurements for Runs #1-10 | | | | | | |
|---|---|---|---|---|---|---|---|
| Run | Run Time (min) | Weight (g) | Duration (s) | Feed Rate (g/min) | Influent Water Flow Rate (gpm) | Influent TSS Conc. (mg/L) | Compliance |
| 1 | 0 | 47.60 | 60 | 47.6 | 61.1 | 199.6 | Y |
| | 29 | 44.05 | 60 | 44.0 | | | |
| | 59 | 46.77 | 60 | 46.8 | | | |
| | CoV | | | 0.0403 | | | |
| 2 | 0 | 45.30 | 60 | 45.3 | 61.1 | 193.4 | Y |
| | 29 | 42.01 | 60 | 42.0 | | | |
| | 59 | 46.96 | 60 | 47.0 | | | |
| | CoV | | | 0.0563 | | | |
| 3 | 0 | 45.05 | 60 | 45.1 | 59.3 | 200.3 | Y |
| | 29 | 42.73 | 60 | 42.7 | | | |
| | 59 | 47.16 | 60 | 47.2 | | | |
| | CoV | | | 0.0492 | | | |
| 4 | 0 | 47.75 | 60 | 47.7 | 59.1 | 207.9 | Y |
| | 29 | 44.64 | 60 | 44.6 | | | |
| | 59 | 47.18 | 60 | 47.2 | | | |
| | CoV | | | 0.0356 | | | |
| 5 | 0 | 47.66 | 60 | 47.7 | 59.2 | 213.8 | Y |
| | 29 | 47.09 | 60 | 47.1 | | | |
| | 59 | 49.08 | 60 | 49.1 | | | |
| | CoV | | | 0.0214 | | | |
| 6 | 0 | 43.01 | 60 | 43.0 | 59.5 | 202.2 | Y |
| | 29 | 47.51 | 60 | 47.5 | | | |
| | 59 | 46.20 | 60 | 46.2 | | | |
| | CoV | | | 0.0508 | | | |
| 7 | 0 | 47.39 | 60 | 47.4 | 59.5 | 211.3 | Y |
| | 29 | 48.43 | 60 | 48.4 | | | |
| | 59 | 46.95 | 60 | 46.9 | | | |
| | CoV | | | 0.0160 | | | |
| 8 | 0 | 44.53 | 60 | 44.5 | 59.5 | 195.8 | Y |
| | 29 | 43.96 | 60 | 44.0 | | | |
| | 59 | 43.87 | 60 | 43.9 | | | |
| | CoV | | | 0.0081 | | | |
| 9 | 0 | 43.90 | 60 | 43.9 | 59.5 | 203.8 | Y |
| | 29 | 45.69 | 60 | 45.7 | | | |
| | 59 | 48.15 | 60 | 48.1 | | | |
| | CoV | | | 0.0465 | | | |
| 10 | 0 | 44.43 | 60 | 44.4 | 59.4 | 200.4 | Y |
| | 29 | 45.41 | 60 | 45.4 | | | |

TABLE 6-continued

Sediment Rate Measurements for Runs #1-10

| Run | Run Time (min) | Weight (g) | Duration (s) | Feed Rate (g/min) | Influent Water Flow Rate (gpm) | Influent TSS Conc. (mg/L) | Compliance |
|---|---|---|---|---|---|---|---|
| | 59 | 45.41 | 60 | 45.4 | | | |
| | CoV | | | 0.0126 | | | |

TABLE 7

Sediment Rate Measurements for Runs #11-20

| Run | Run Time (min) | Weight (g) | Duration (s) | Feed Rate (g/min) | Influent Water Flow Rate (gpm) | Influent TSS Conc. (mg/L) | Compliance |
|---|---|---|---|---|---|---|---|
| 11 | 0 | 44.17 | 60 | 44.2 | 59.5 | 200.2 | Y |
| | 29 | 44.68 | 60 | 44.7 | | | |
| | 59 | 46.34 | 60 | 46.3 | | | |
| | CoV | | | 0.0252 | | | |
| 12 | 0 | 46.51 | 60 | 46.5 | 59.4 | 207.7 | Y |
| | 29 | 45.92 | 60 | 45.9 | | | |
| | 59 | 47.66 | 60 | 47.7 | | | |
| | CoV | | | 0.0190 | | | |
| 13 | 0 | 44.70 | 60 | 44.7 | 59.4 | 195.2 | Y |
| | 29 | 43.83 | 60 | 43.8 | | | |
| | 59 | 43.04 | 60 | 43.0 | | | |
| | CoV | | | 0.0190 | | | |
| 14 | 0 | 45.27 | 60 | 45.3 | 59.4 | 196.8 | Y |
| | 29 | 43.57 | 60 | 43.6 | | | |
| | 59 | 43.78 | 60 | 43.8 | | | |
| | CoV | | | 0.0210 | | | |
| 15 | 0 | 44.08 | 60 | 44.1 | 59.4 | 187.5 | Y |
| | 29 | 41.15 | 60 | 41.1 | | | |
| | 59 | 41.13 | 60 | 41.1 | | | |
| | CoV | | | 0.0404 | | | |
| 16 | 0 | 44.02 | 60 | 44.0 | 59.4 | 199.8 | Y |
| | 29 | 46.16 | 60 | 46.2 | | | |
| | 59 | 44.70 | 60 | 44.7 | | | |
| | CoV | | | 0.0243 | | | |
| 17 | 0 | 43.41 | 60 | 43.4 | 59.5 | 197.1 | Y |
| | 29 | 45.10 | 60 | 45.1 | | | |
| | 59 | 44.71 | 60 | 44.7 | | | |
| | CoV | | | 0.0199 | | | |
| 18 | 0 | 47.52 | 60 | 47.5 | 59.6 | 205.8 | Y |
| | 29 | 46.68 | 60 | 46.7 | | | |
| | 59 | 45.00 | 60 | 45.0 | | | |
| | CoV | | | 0.0276 | | | |
| 19 | 0 | 45.83 | 60 | 45.8 | 59.4 | 198.9 | Y |
| | 29 | 45.24 | 60 | 45.2 | | | |
| | 59 | 42.91 | 60 | 42.9 | | | |
| | CoV | | | 0.0345 | | | |
| 20 | 0 | 44.05 | 60 | 44.0 | 59.3 | 204.4 | Y |
| | 29 | 44.75 | 60 | 44.7 | | | |
| | 59 | 48.95 | 60 | 49.0 | | | |
| | CoV | | | 0.0578 | | | |

TABLE 8

Sediment Rate Measurements for Runs #21-26

| Run | Run Time (min) | Weight (g) | Duration (s) | Feed Rate (g/min) | Influent Water Flow Rate (gpm) | Influent TSS Conc. (mg/L) | Compliance |
|---|---|---|---|---|---|---|---|
| 21 | 0 | 42.85 | 60 | 42.9 | 58.6 | 200.5 | Y |
| | 29 | 47.07 | 60 | 47.1 | | | |

TABLE 8-continued

Sediment Rate Measurements for Runs #21-26

| Run | Run Time (min) | Weight (g) | Duration (s) | Feed Rate (g/min) | Influent Water Flow Rate (gpm) | Influent TSS Conc. (mg/L) | Compliance |
|---|---|---|---|---|---|---|---|
| | 59 | 43.69 | 60 | 43.7 | | | |
| | CoV | | | 0.0501 | | | |
| 22 | 0 | 41.08 | 60 | 41.1 | 53.6 | 202.1 | Y |
| | 29 | 41.77 | 60 | 41.8 | | | |
| | 59 | 40.05 | 60 | 40.1 | | | |
| | CoV | | | 0.0211 | | | |
| 23 | 0 | 38.66 | 60 | 38.7 | 53.4 | 193.4 | Y |
| | 29 | 40.43 | 60 | 40.4 | | | |
| | 59 | 38.25 | 60 | 38.3 | | | |
| | CoV | | | 0.0296 | | | |
| 24 | 0 | 40.13 | 60 | 40.1 | 53.1 | 186.5 | Y |
| | 29 | 34.94 | 60 | 34.9 | | | |
| | 59 | 37.29 | 60 | 37.3 | | | |
| | CoV | | | 0.0693 | | | |
| 25 | 0 | 42.75 | 60 | 42.7 | 53.2 | 209.9 | Y |
| | 29 | 42.88 | 60 | 42.9 | | | |
| | 59 | 41.27 | 60 | 41.3 | | | |
| | CoV | | | 0.0211 | | | |
| 26 | 0 | 40.37 | 60 | 40.4 | 54.0 | 203.8 | Y |
| | 29 | 40.14 | 60 | 40.1 | | | |
| | 59 | 42.72 | 60 | 42.7 | | | |
| | CoV | | | 0.0347 | | | |

Effluent TSS

During each run, grab samples were taken of the effluent according to the schedule in Table 1, and TSS analysis was conducted. For each run, the average effluent concentration was adjusted by subtracting the average background TSS concentration. The average adjusted effluent TSS concentration during testing was 24 mg/L, with individual run averages ranging from 21 to 30 mg/L. Adjusted effluent TSS concentrations for each run are given in Table 10.

Drawdown TSS

According to the filter protocol, the amount of sediment that leaves the filter during the drawdown period must be accounted for and documented. Drawdown TSS was determined by grab sampling and analysis. For each run, the average drawdown concentration was adjusted by subtracting the average background TSS concentration. The average adjusted drawdown TSS was 25 mg/L, with individual run averages ranging from 17 to 56 mg/L. In order to estimate the volume of water during drawdown, the unit was filled prior to all testing with clean water and the drawdown volume as a function of time was measured using the timed bucket method. Total drawdown volume was estimated at 117.5 gal at an operating head of 24 inches. This volume was used to determine the void fraction of the media bed, which was then used to calculate the drawdown volume for incremental head levels above 24 inches. Adjusted average drawdown TSS concentrations are given in Table 9.

TABLE 9

Removal Efficiency Drawdown Losses

| Run # | Head Level at End of Run (in) | Drawdown Volume (gal) | Average Adjusted Drawdown TSS Conc. (mg/L) | Total Sediment Lost During Drawdown (g) |
|---|---|---|---|---|
| 1 | 25.125 | 121.7 | 38.0 | 17.5 |
| 2 | 27 | 128.8 | 41.5 | 20.2 |
| 3 | 27.25 | 129.7 | 38.0 | 18.7 |
| 4 | 27.875 | 132.1 | 56.0 | 28.0 |
| 5 | 28.625 | 134.9 | 32.5 | 16.6 |
| 6 | 28.75 | 135.4 | 28.5 | 14.6 |
| 7 | 29.75 | 139.1 | 24.0 | 12.6 |
| 8 | 29.875 | 139.6 | 19.0 | 10.0 |
| 9 | 30.375 | 141.5 | 22.0 | 11.8 |
| 10 | 30.75 | 142.9 | 21.0 | 11.4 |
| 11 | 30.5 | 141.9 | 19.5 | 10.5 |
| 12 | 31.5 | 145.7 | 19.5 | 10.8 |
| 13 | 31.5 | 145.7 | 17.5 | 9.7 |
| 14 | 32.25 | 148.5 | 20.0 | 11.2 |
| 15 | 32.875 | 150.9 | 19.5 | 11.1 |
| 16 | 33.375 | 152.8 | 24.5 | 14.2 |
| 17 | 33.875 | 154.6 | 22.5 | 13.2 |
| 18 | 34.125 | 155.6 | 22.5 | 13.3 |
| 19 | 35 | 158.9 | 22.5 | 13.5 |
| 20 | 35.25 | 159.8 | 24.0 | 14.5 |
| 21 | 35.875 | 162.2 | 23.0 | 14.1 |
| 22 | 32.5 | 149.5 | 18.0 | 10.2 |
| 23 | 33.25 | 152.3 | 18.5 | 10.7 |
| 24 | 33.5 | 153.2 | 18.5 | 10.7 |
| 25 | 35.5 | 160.7 | 20.5 | 12.5 |
| 26 | 36.25 | 163.6 | 29.0 | 18.0 |

Removal Efficiency Calculation

Removal efficiency was calculated using the following equation from the filter protocol:

$$\text{Removal Efficiency}(\%) = $$

$$\frac{\begin{pmatrix} \text{Average Influent} \\ \text{TSS Concentration} \times \\ \text{Total Volume} \\ \text{of Test Water} \end{pmatrix} - \begin{pmatrix} \text{Average Effluent} \\ \text{TSS Concentration} \times \\ \text{Total Volume} \\ \text{of Effluent Water} \end{pmatrix} - \begin{pmatrix} \text{Average} \\ \text{Drawdown Flow} \\ \text{TSS Concentration} \times \\ \text{Total Volume} \\ \text{of Drawdown Water} \end{pmatrix}}{\text{Average Effluent TSS Concentration} \times \text{Total Volume of Test Water}} \times 100$$

For each run, sediment concentrations of background, influent, effluent, and drawdown, as well as calculated removal efficiency, are summarized in Table 10. As shown in this summary table, the system 100 demonstrated a cumulative sediment removal efficiency of 87.4% over the course of 26 test runs. No removal efficiencies below 80% were experienced.

Sediment Mass Loading

Sediment mass loading for each run was approximately 8.69 lbs on average for runs #1-21, and 7.71 lbs for runs 22-26 (lower for these runs, due to reduced flow rate and a desire to keep the influent TSS concentration at 200 mg/L). These data are summarized in Table 11.

TABLE 11

Sediment Mass Loading Summary

| Run # | Sediment Loading (lbs) | Cumulative Sediment Loading (lbs) |
|---|---|---|
| 1 | 8.85 | 8.9 |
| 2 | 8.59 | 17.4 |
| 3 | 8.63 | 26.1 |
| 4 | 8.93 | 35.0 |
| 5 | 9.19 | 44.2 |
| 6 | 8.74 | 52.9 |
| 7 | 9.13 | 62.0 |
| 8 | 8.46 | 70.5 |
| 9 | 8.80 | 79.3 |
| 10 | 8.65 | 88.0 |
| 11 | 8.64 | 96.6 |
| 12 | 8.96 | 105.6 |
| 13 | 8.41 | 114.0 |
| 14 | 8.48 | 122.4 |
| 15 | 8.08 | 130.5 |
| 16 | 8.62 | 139.2 |
| 17 | 8.51 | 147.7 |
| 18 | 8.90 | 156.6 |
| 19 | 8.57 | 165.1 |

TABLE 10

Removal Efficiency Results

| Run # | Average Influent TSS (mg/L) | Adjusted Influent Water Volume (gal) | Adjusted Average Effluent TSS (mg/L) | Effluent Water Volume (gal) | Adjusted Average Drawdown TSS (mg/L) | Drawdown Water Volume (gal) | Single Run Removal Efficiency (%) | Mass of Captured Sediment (g) | Cumulative Removal Efficiency (%) |
|---|---|---|---|---|---|---|---|---|---|
| 1 | 200 | 5315.69 | 21 | 5438 | 37 | 122 | 88.7 | 3559 | 88.6 |
| 2 | 193 | 5319.659 | 23 | 5442 | 41 | 129 | 87.5 | 3407 | 88.1 |
| 3 | 200 | 5162.189 | 22 | 5281 | 38 | 130 | 88.3 | 3452 | 88.1 |
| 4 | 208 | 5144.789 | 24 | 5263 | 56 | 132 | 87.7 | 3546 | 88.0 |
| 5 | 214 | 5153.743 | 24 | 5272 | 32 | 135 | 88.0 | 3669 | 88.0 |
| 6 | 202 | 5177.194 | 24 | 5296 | 28 | 135 | 87.4 | 3460 | 87.9 |
| 7 | 211 | 5176.666 | 26 | 5296 | 24 | 139 | 87.4 | 3616 | 87.8 |
| 8 | 196 | 5180.459 | 24 | 5300 | 19 | 140 | 87.2 | 3344 | 87.7 |
| 9 | 204 | 5175.337 | 26 | 5294 | 22 | 141 | 86.9 | 3466 | 87.6 |
| 10 | 200 | 5170.166 | 26 | 5289 | 21 | 143 | 86.6 | 3393 | 87.5 |
| 11 | 200 | 5173.225 | 24 | 5292 | 19 | 142 | 87.8 | 3439 | 87.5 |
| 12 | 208 | 5166.431 | 25 | 5285 | 19 | 146 | 87.3 | 3545 | 87.5 |
| 13 | 195 | 5165.386 | 23 | 5284 | 17 | 146 | 87.8 | 3350 | 87.5 |
| 14 | 197 | 5164.076 | 24 | 5283 | 20 | 149 | 87.3 | 3356 | 87.5 |
| 15 | 187 | 5166.441 | 22 | 5285 | 19 | 151 | 87.9 | 3222 | 87.5 |
| 16 | 200 | 5170.86 | 30 | 5290 | 24 | 153 | 84.6 | 3306 | 87.3 |
| 17 | 197 | 5175.806 | 26 | 5295 | 22 | 155 | 86.4 | 3335 | 87.3 |
| 18 | 206 | 5182.316 | 27 | 5301 | 22 | 156 | 86.4 | 3487 | 87.2 |
| 19 | 199 | 5163.518 | 26 | 5282 | 22 | 159 | 86.6 | 3364 | 87.2 |
| 20 | 204 | 5159.608 | 26 | 5278 | 24 | 160 | 86.6 | 3452 | 87.2 |
| 21 | 201 | 5101.729 | 24 | 5219 | 22 | 162 | 87.7 | 3392 | 87.2 |
| 22 | 202 | 4659.524 | 21 | 4767 | 18 | 149 | 89.1 | 3172 | 87.3 |
| 23 | 193 | 4648.508 | 23 | 4755 | 18 | 152 | 87.9 | 2987 | 87.3 |
| 24 | 187 | 4619.016 | 22 | 4725 | 18 | 153 | 87.6 | 2854 | 87.3 |
| 25 | 210 | 4631.264 | 23 | 4738 | 19 | 161 | 88.8 | 3265 | 87.3 |
| 26 | 204 | 4630.463 | 21 | 4737 | 20 | 164 | 89.1 | 3181 | 87.4 |
| Ave | 201 | 5075.156 | 24 | 5191.8 | 24.5 | 146.2 | 87.5 | 3370 | N/A |
| Cumulative Mass Removed (g) | | | | | | | | 87619 | |
| Cumulative Mass Removed (lbs) | | | | | | | | 193.2 | |
| Total Mass Loaded (lbs) | | | | | | | | 221.0 | |
| Cumulative Removal Efficiency (%) | | | | | | | | 87.4 | |

TABLE 11-continued

Sediment Mass Loading Summary

| Run # | Sediment Loading (lbs) | Cumulative Sediment Loading (lbs) |
|---|---|---|
| 20 | 8.80 | 173.9 |
| 21 | 8.54 | 182.5 |
| 22 | 7.86 | 190.3 |
| 23 | 7.50 | 197.8 |
| 24 | 7.19 | 205.0 |
| 25 | 8.11 | 213.1 |
| 26 | 7.88 | 221.0 |

Sediment mass loading was calculated from the average measured doser rate for a given run and the run time, minus the mass of the sediment removed during doser sampling.

Overall, a total of 221 lbs of sediment was loaded into the system 100 unit over the course of the 26 runs. This amount was confirmed through a mass balance of the doser itself, in which the total sediment loaded into the doser over the course of all 26 runs was tallied; the amount removed from the doser during sediment rate measurements was subtracted; and the amount remaining in the doser after the end of Run #26 was quantified and subtracted. The end result of these measurements and calculations was an estimated sediment mass loading of 219.5 lbs (a difference of 0.7% from the amount determined through sediment rate measurement).

Figure 8:
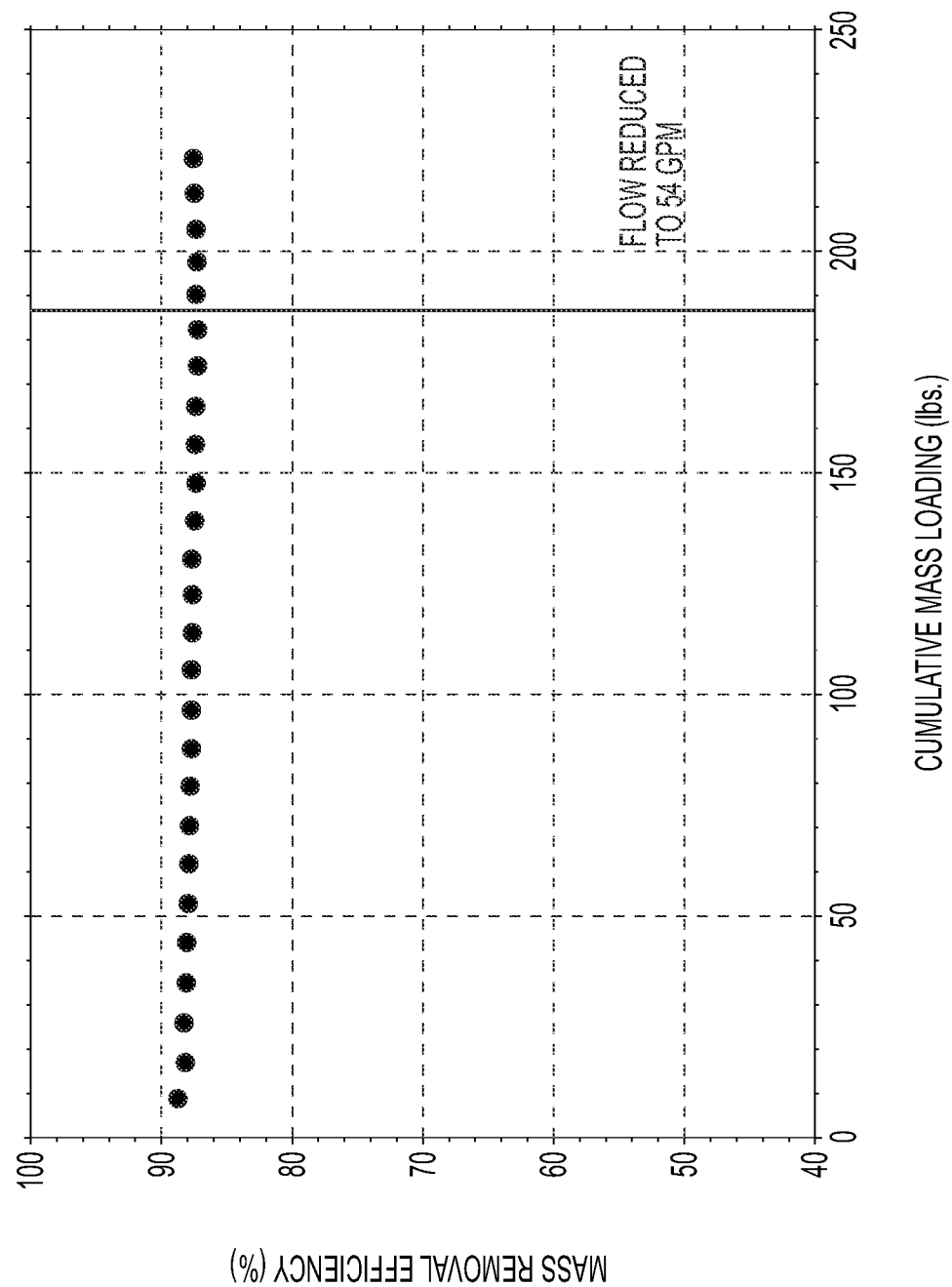
FIG. 8 illustrates the removal efficiency versus sediment mass loading, consistent with embodiments of this disclosure.
Figure 9:
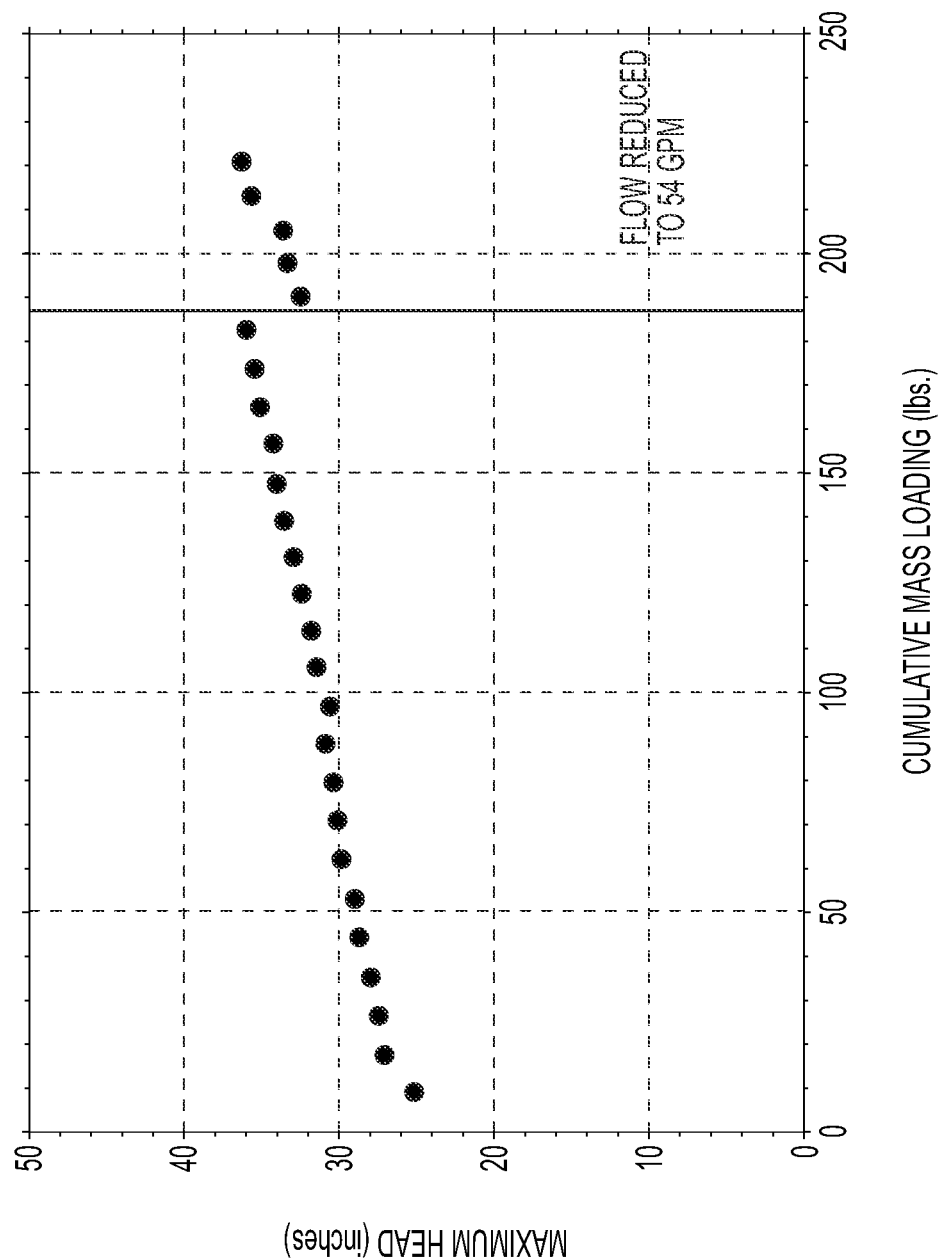
FIG. 9 illustrates the driving head versus sediment mass loading, consistent with embodiments of this disclosure.

The relationship between removal efficiency and sediment mass loading is shown in FIG. 8. The relationship between driving head and sediment mass loading is shown in FIG. 9.

Scour Run Results

The scour test took place on a unit that had been pre-loaded with 100% of the manufacturer's recommended maximum sediment storage volume (which occurred during removal efficiency and sediment mass capacity testing). Scour testing was conducted in accordance with the filter protocol, with the exception of loading, which was done as part of the mass removal efficiency and sediment mass loading testing described above. The target scour testing flow rate was achieved 5 minutes after initiating flow to the system; effluent sampling began 2 minutes after that, and background samples were taken with odd-numbered effluent samples, according to the schedule shown in Table 12.

TABLE 12

Scour Run Sampling Schedule

| Sample | Run Time (min) | | | | | | | | | | | | | | |
|---|---|---|---|---|---|---|---|---|---|---|---|---|---|---|---|
| | 0 | 2 | 4 | 6 | 8 | 10 | 12 | 14 | 16 | 18 | 20 | 22 | 24 | 26 | 28 | 30 |
| Effluent | | X | X | X | X | X | X | X | X | X | X | X | X | X | X | X |
| Background | | X | | X | | X | | X | | X | | X | | X | | X |

Note:
The Run Time of 0 minutes was the time at which the target flow rate was achieved.

The feed flow rate during the scour run averaged 111.2 gpm (185% of MTFR), with a CoV of 0.0031, which is in compliance with the filter protocol. The maximum temperature during the scour run was 56.8 degrees Fahrenheit, which is also in compliance with the filter protocol.

Scour test TSS results are presented in Table 13. The maximum background TSS concentration was 2 mg/L, which is far below the maximum of 20 mg/L allowed by the filter protocol. Each effluent TSS concentration was adjusted by subtracting the background concentration. For samples that did not have a corresponding background sample, the background TSS concentration was interpolated from the previous and subsequent background samples' TSS concentration. The average adjusted TSS concentration of the effluent is 2 mg/L. As this value is below the protocol-specified limit of 20 mg/L, the system 100 unit met the requirement for on-line use.

TABLE 13

Scour Run TSS Results

| | Scour Test TSS Concentrations (mg/L) | | | | | | | | | | | | | | |
|---|---|---|---|---|---|---|---|---|---|---|---|---|---|---|---|
| Sample # | 1 | 2 | 3 | 4 | 5 | 6 | 7 | 8 | 9 | 10 | 11 | 12 | 13 | 14 | 15 |
| Effluent | 16 | 6 | 6 | 3 | 3 | 2 | 4 | 2 | 2 | 2 | 2 | 2 | 1 | 1 | 1 |
| Background | 2 | | 2 | | 2 | | 1 | | 2 | | 1 | | 1 | | 1 |
| Adjusted Effluent | 14 | 4 | 4 | 1 | 1 | 0.5 | 3 | 0.5 | 0 | 0.5 | 1 | 1 | 0 | 0 | 0 |
| Average Adjusted Effluent Concentration mg/L) | | | | | | | | 2.0 | | | | | | | |

Design Limitations

The design limitations discussed herein are non-limiting and are provided to show parameters used in this Example. System 100 is not limited to the parameters described herein.

Maximum Flow Rate: The system 100 unit has an MTFR of 0.13 cfs (60 gpm) and a filtration surface area (FSA) of 60 ft$^2$ (loading rate=1.0 gpm/ft$^2$).

Slope: The system 100 unit is recommended for installation with little-to-no slope to ensure proper, consistent operation.

Allowable Head Loss: There is an operational head loss associated with system 100 unit. The head loss will increase over time due to the sediment loading to the system. When configured with an internal bypass, a design head loss of 36 inches should be used.

Sediment Load Capacity: Based on laboratory testing results, the system 100 unit has a mass loading capacity of 221 lbs.

Pre-treatment Requirements: The system 100 unit does not require additional pre-treatment.

Configurations: The system 100 may have multiple configurations, with curb, gutter, grated inlet, or straight-in pipe inlets. The system 100 can be installed above, at, or below grade and with or without a planting bed to allow maximum design flexibility.

Structure Load Limitations: The system 100 unit may be located adjacent to a roadway and therefore, the precast vault or structure is designed to handle H-20 traffic loads.

FIGS. 10A-10D illustrate another stormwater management system 400 with portions of its housing 401 removed, consistent with embodiments of this disclosure. The stormwater management system 400 may share features with stormwater management system 100, described in detail above. In some embodiments, stormwater management system 400 may provide a third chamber 403 in addition to first chamber 103 and second chamber 105 described above. Accordingly, stormwater management system 400 may include the components of stormwater management system 100 described above, and may be connected in series with stormwater management system 100. Stormwater management system 400 may be connected to stormwater management system 100, creating a continuous housing with the combination of housing 201 and housing 401.

In some embodiments, outlet 125 from filter manifold apparatus 123 may extend through an interior wall 408 that separates second chamber 105 and third chamber 403. Outlet 125 may connect to a third chamber inlet 411, third chamber inlet 411 may extend into third chamber 403 and may turn downward along wall 408 and extend towards the bottom of third chamber 403.

Third chamber inlet 411 may connect to one or more delivery pipes 415 that extend into third chamber 403 along the bottom or near the bottom of third chamber 403. Delivery pipes 415 may extend outwardly from inlet pipe 411 along wall 408 at the bottom of third chamber 403 towards a front wall and a back wall of third chamber 403. In some embodiments, the delivery pipes 415 may extend across the bottom of third chamber 403. For example, delivery pipes 415 may extend across the bottom of third chamber 403 in multiple locations, including near the back wall of third chamber 403, near the middle of third chamber 403, and near the front wall of third chamber 403.

Delivery pipes 415 may include sections of perforations that provide fluid delivery into third chamber 403 from outlet 125. In some embodiments, each delivery pipe 415 may include perforations that provide fluid delivery into third chamber 403 in multiple locations. Delivery pipes 415 may include perforations at the outward extensions from inlet pipe 411, near the back wall of third chamber 403, near the middle of third chamber 403, and near the front wall of third chamber 403. Delivery pipes 415 may be wrapped in a fine mesh which may prevent filter media (e.g. filter media 450 described below) from entering the perforations of delivery pipes 415. Although three branches of delivery pipes 415 are shown, any suitable number and arrangement of delivery pipes 415 may be used to provide fluid flow into third chamber 403. In some embodiments, the positioning of the branches of delivery pipes 415 may provide balanced fluid flow to the entire third chamber 403.

In some embodiments, stormwater management system 400 may also include one or more riser pipes 420. Riser pipes 420 may extend vertically from a bottom surface of third chamber 403 towards a top surface of third chamber 403. Riser pipes 420 may include a non-perforated section extending from the base of the riser pipes 420 to a vertical position of riser pipes 420 above which is a perforated section of riser pipes 420. The vertical position at which the perforated section of riser pipes 420 begins may vary, and in some embodiments, the perforated section may be positioned above the level of filter media 450 in third chamber 403. In a non-limiting example, the perforated section of riser pipes 420 may begin at a vertical position half-way up the depth of third chamber 403. In another non-limiting example, the perforated section of riser pipes 420 may begin at a vertical position between fifteen (15) and twenty-five (25) inches above the bottom surface of third chamber 403. In another non-limiting example, the perforated section of riser pipes 420 may being at a vertical position nineteen (19) inches above the bottom surface of third chamber 403. In some embodiments, the perforated section of riser pipes 420 may be wrapped in a geotextile fabric to assist in the draining of fluid through riser pipes 420.

In some embodiments, a bottom portion of riser pipes 420 may turn ninety (90) degrees at the base of riser pipes 420 to extend through an outer wall of housing 401 via outlet pipes 422. Outlet pipes 422 may allow for fluid from third chamber 403 to exit housing 401 and may be positioned near or at the bottom surface of third chamber 403. Outlet pipes 422 may also extend in the opposite direction to an internal portion 424 of outlet pipes 422 along the bottom surface of third chamber 403. Internal portion 424 of outlet pipes 422 may be perforated in order to allow fluid to enter internal portion 424 of the outlet pipes 422.

FIG. 10C illustrates a perspective cross-sectional view of the base of riser pipe 420 and the connection of riser pipe 420 to outlet pipe 422 and internal portion 424 of outlet pipe 422. Internal portion 424 may be separated from outlet pipe 422 by a partial wall 440 having a weep hole 442 that extends through partial wall 440. Weep hole 442 allows a selective amount of fluid to flow from internal portion 424 to outlet pipe 422.

The perforations of delivery pipes 415, riser pipes 420, and internal portions 424 of outlet pipes 422 may be circular, slits, or elongated shapes, but are not limited to these shapes.

Figure 10A:
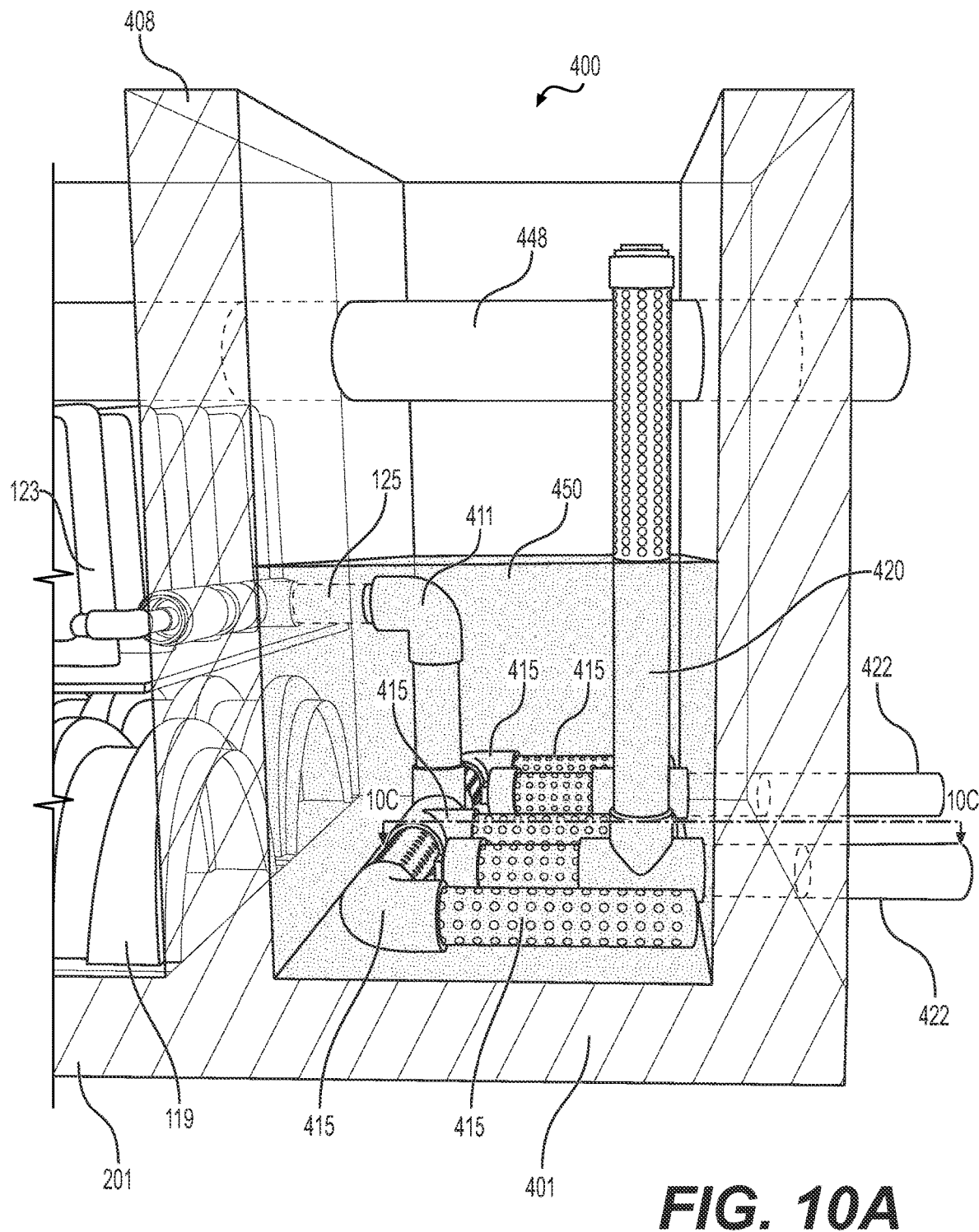
FIG. 10A illustrates a rear perspective view of another stormwater management system with portions of its housing removed, consistent with embodiments of this disclosure.
Figure 10D:
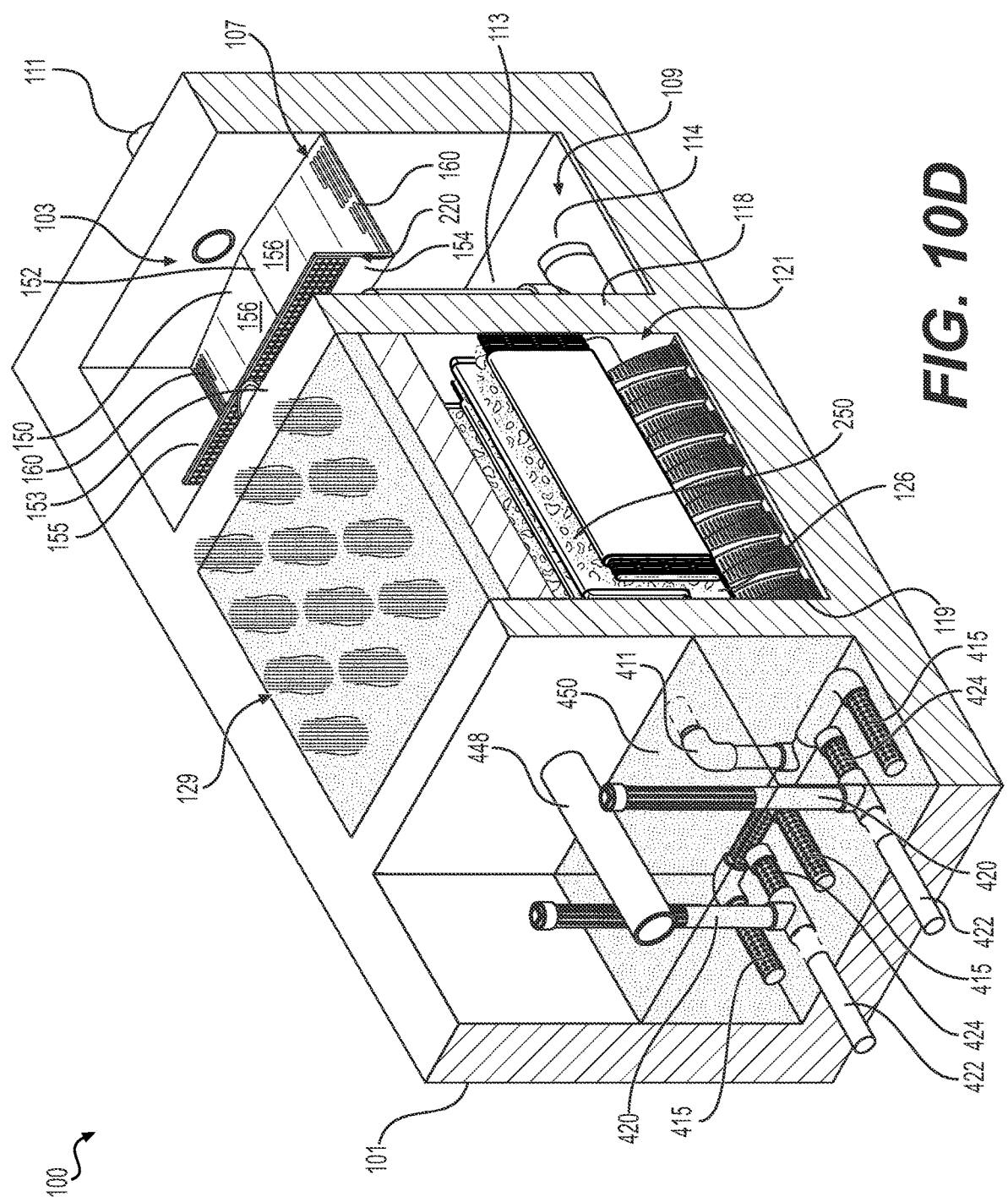
FIG. 10D illustrates a perspective view of the storm water management system shown in FIG. 10A, consistent with embodiments shown of this disclosure.

FIG. 10A illustrates stormwater management system 400 may include a bypass pipe 448 that may connect to bypass pipe 153 from stormwater management system 100. The connection of bypass pipe 448 to bypass pipe 153 may allow fluid to flow through fluid management system 100 and fluid management system 400 without being treated other than passing through perforated plate 155. The bypassed fluid flowing through bypass pipe 153 may be disposed of via outlet bypass pipe 448, different from outlet pipes 422.

During operation, bypass pipes 153 and 448 may bypass fluid flow in excess of design treatment flows.

Third chamber 403 may be partially filled with filter media 450. In some embodiments, filter media 450 may be filled from the bottom surface of third chamber 403 to just below the perforated section of riser pipes 420. In other embodiments, filter media 450 may be filled just above the perforated section of riser pipes 420. In a non-limiting example, filter media 450 may fill third chamber 403 from the bottom of third chamber 403 to below the perforated section of riser pipes 420, which may begin at a vertical position half-way up the depth of third chamber 403. In another non-limiting example, filter media 450 may fill third chamber 403 to a level between fourteen (14) and twenty-four (24) inches above the bottom surface of third chamber 403. In another non-limiting example, filter media 450 may fill third chamber 403 to a level of eighteen (18) inches above the bottom surface of the third chamber 403.

Filter media 450 may include zeolite or other materials that may be effective to remove contaminants, such as metals, bacteria (e.g. *E. coli*), or combinations thereof. For example, filter media 450 may be selected and configured for processing water yielded from stormwater runoff processed by fluid management system 100. In other embodiments, filter media 450 may include zeolite, and the filter media 250 may be used to remove bacteria (e.g. *E. coli*). In some embodiments, filter media 450 in third chamber 403 may be selected for processing chemical adsorption after filter media 250 processes oil and/or grease and removes sediment upstream from filter media 450.

Filter media 450 may differ from filter media 250, and filter media 250 may have a first filter combination and filter media 450 may have a second filter combination. The first filter combination may include filter media 250, and may include sand (e.g., pool filter sand), perlite, alumina (e.g., activated alumina), combinations thereof, or any other material that may be effective to remove contaminants, such as phosphorous, and/or total suspended solids ("TSS"). The second filter combination may include filter media 450 effective for removal of metals, bacteria (e.g. *E. coli*), or combinations thereof, and the second filter media may include zeolite. In some embodiments, the second combination of filter media 450 may be positioned downstream of the first combination of filter media 250. Accordingly, the combination of filter media 250 and filter media 450 in sequence may provide removal of contaminants, such as phosphorous, and/or total suspended solids ("TSS") and removal of metals, bacteria (e.g. *E. coli*), or combinations thereof.

Fluid flow through third chamber 403 may begin at third chamber inlet 411 that receives filtered fluid output via outlet 125. As described above, filtered fluid output via outlet 125 may be filtered via filter media 250, which may be effective to remove contaminants, such as phosphorous, nitrogen, other metals, and/or total suspended solids ("TSS"). Third chamber inlet 411 may direct fluid into delivery pipes 415, and the perforations in the branches of delivery pipes 415 may allow fluid to enter third chamber 403 near the bottom surface of third chamber 403. Fluid from delivery pipes 415 may flow into filter media 450 in third chamber 403 and may flow in an upward direction through filter media 450 in third chamber 403 as fluid continues to flow through delivery pipes 415. Upward fluid flow may flow through the top level of filter media 450 and continue to fill third chamber 403 above filter media 450. Fluid above filter media 450 may reach the level of the perforated section of riser pipes 420 and may enter riser pipes 420 via the perforated section above filter media 450. Fluid that enters riser pipes 420 via the perforated sections may travel downward through riser pipes 420 and turn into outlet pipes 422 to exit housing 401.

In some embodiments, stormwater management system 400 may include a bypass fluid path that may include the connection of bypass pipe 448 to bypass pipe 153. The bypass fluid path may allow fluid to flow through fluid management system 100 and fluid management system 400 without being treated other than passing through perforated plate 155. The bypassed fluid flowing through bypass pipe 153 may be disposed of via outlet bypass pipe 448, different from outlet pipes 422. During operation, bypass pipes 153 and 448 may bypass fluid flow in excess of design treatment flows.

In some embodiments, stormwater management system 400 may also include drain fluid flow that may allow fluid in third chamber 403 to drain when fluid flow through stormwater management system 400 is low or not high enough to supply fluid to fill third chamber 403 above the level of filter media 450 and into riser pipes 420. The drain fluid flow may enter through internal portion 424 of outlet pipes 422 that may be separated from outlet pipe 422 by a partial wall 440 having a weep hole 442 that extends through partial wall 440. Weep hole 442 allows a selective amount of fluid to flow from internal portion 424 to outlet pipe 422. The selective amount of fluid flow through internal portion 424 and weep hole 442 may allow third chamber 403 to drain fluid if fluid flow through stormwater management system 400 is low or not high enough to supply fluid to fill third chamber 403.

FIG. 11 illustrates another stormwater management system 500 with portions of its housing 501 removed, consistent with embodiments of this disclosure. Stormwater management system 500 may share features with stormwater management systems 100, 400, described in detail above. In some embodiments, stormwater management system 500 may provide a third chamber 503 in addition to first chamber 103 and second chamber 105 described above. Accordingly, stormwater management system 500 may include the components of stormwater management system 100 described above, and may be connected in series with stormwater management system 100. Stormwater management system 500 may be connected to stormwater management system 100, creating a continuous housing with the combination of housing 201 and housing 401.

In some embodiments, outlet 125 from filter manifold apparatus 123 may extend through an interior wall 508 that separates second chamber 105 and third chamber 503. Outlet 125 may connect to a third chamber inlet 511. Third chamber inlet 511 may extend into third chamber 503 and may be terminated before a deflector 514. Deflector 514 may direct fluid flow from third chamber inlet 511 in a downward direction towards the bottom surface of third chamber 503. Deflector 514 may have a curved wall 516 that defines a chamber between deflector 514 and wall 508 allowing fluid from third chamber inlet 511 to enter the third chamber 503 and be directed downward by deflector 514.

In some embodiments, third chamber 503 may include riser pipes 520. Riser pipes 520 may have similar features to riser pipes 420. For example, riser pipes 520 may have a non-perforated section and a perforated section, where the perforated section of riser pipes 520 extends above the level of filter media 450. Filter media 450 may be used in stormwater management system 400 and stormwater management system 500.

Fluid may flow into third chamber 503 via third chamber inlet 511, and may flow downward to the bottom surface of third chamber 503 after being directed by deflector 514. Fluid may flow upwards from the bottom surface of third chamber 503, through filter media 450, and may enter riser pipes 520 via the perforated sections. Fluid may flow down riser pipes 520 and may exit housing 501 via outlet pipes 522 extending through housing 501.

In some embodiments, stormwater management system 500 may include a bypass fluid path that may include the connection of bypass pipe 548 to bypass pipe 153. The bypass fluid path may allow fluid to flow through fluid management system 100 and fluid management system 500 without being treated other than passing through perforated plate 155. The bypassed fluid flowing through bypass pipe 153 may be disposed of via outlet bypass pipe 548, different from outlet pipes 522. During operation, bypass pipes 153 and 548 may bypass fluid flow in excess of design treatment flows.

It should be noted that the products and/or processes disclosed may be used in combination or separately. Additionally, exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the prior detailed description be considered as exemplary only, with the true scope and spirit being indicated by the following claims.

The examples presented herein are for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

What is claimed is:

1. A fluid management system, comprising:
a chamber configured to remove contaminants from a processed fluid, the chamber comprising:
an inlet configured to receive the processed fluid;
one or more delivery pipes connected to the inlet and positioned along a base of the chamber, the one or more delivery pipes having openings that communicate the processed fluid into the chamber;
one or more riser pipes extending vertically in the chamber, the one or more riser pipes having a perforated section vertically displaced from the base of the chamber;
filter media disposed in the chamber configured to separate contaminants from the processed fluid;
an outlet coupled to the one or more riser pipes to receive filtered fluid from the chamber.

2. The fluid management system of claim 1, wherein the riser pipes comprise a fabric wrap disposed around at least a portion of the riser pipes.

3. The fluid management system of claim 1, wherein the filter media is disposed between the base of the chamber and the perforated section of the one or more riser pipes.

4. The fluid management system of claim 1, wherein the filter media comprises zeolite.

5. The fluid management system of claim 1, further comprising:
a filtering apparatus configured to process pre-processed fluid by removing contaminants from the pre-processed fluid before the processed fluid enters the inlet.

6. The fluid management system of claim 5, wherein the filtering apparatus comprises a second filter media different than the filter media in the chamber.

7. The fluid management system of claim 6, wherein:
the second filter media is effective to remove at least one of phosphorous, total suspended solids, or combinations thereof from the pre-processed fluid, and
the filter media in the chamber is effective for the removal of at least one of metals, bacteria, and combinations thereof from the processed fluid.

8. The fluid management system of claim 1, wherein the one or more delivery pipes communicate processed fluid into the base of the chamber, and the pre-processed fluid flows vertically through the filter media to exit the chamber via the perforated section of the one or more riser pipes.

9. The fluid management system of claim 1, wherein the riser pipes further comprise a second perforated section positioned along a base of the chamber.

10. The fluid management system of claim 9, wherein the second perforated section provides a drain fluid to the outlet.

11. The fluid management system of claim 1, comprising a bypass pipe configured to receive at least a portion of pre-processed fluid and a second outlet coupled to the bypass pipe.

12. The fluid management system of claim 11, wherein the at least a portion of the pre-processed fluid is configured to flow through the bypass pipe but not the filtering apparatus.

13. A filter chamber for a fluid management system configured to remove contaminants from a processed fluid, comprising:
one or more delivery pipes extending from an inlet and positioned along a base of the filter chamber, the one or more delivery pipes having openings that communicate the processed fluid into the filter chamber;
one or more riser pipes extending vertically through the filter chamber, the one or more riser pipes having a perforated section vertically displaced from the base of the filter chamber; and
filter media disposed in the filter chamber configured to separate contaminants from the processed fluid.

14. The filter chamber of claim 13, wherein the riser pipes comprise a fabric wrap disposed around at least a portion of the riser pipes.

15. The filter chamber of claim 13, wherein filter media is disposed between the base of the filter chamber and the perforated section of the one or more riser pipes.

16. The filter chamber of claim 13, wherein the filter media comprises zeolite.

17. The filter chamber of claim 13, further comprising an outlet coupled to the one or more riser pipes to receive filtered fluid from the filter chamber.

18. A fluid management system, comprising:
an inlet configured to receive pre-processed fluid;
a diffusion plate configured to receive the pre-processed fluid and to direct the pre-processed fluid along either a bypass fluid flow path or a primary fluid flow path;
a filtering apparatus disposed in the primary fluid flow path, configured to receive at least a first portion of the pre-processed fluid from the diffusion plate, and configured to remove contaminants from the pre-processed fluid;
a filter chamber disposed in the primary fluid flow path, configured to receive processed fluid from the filtering apparatus, the filter chamber comprising:
one or more delivery pipes extending from the inlet and positioned along a base of the filter chamber, the one or more delivery pipes having openings that communicate the processed fluid into the filter chamber;
one or more riser pipes extending vertically through the filter chamber, the one or more riser pipes having a perforated section vertically displaced from the base of the filter chamber; and
filter media disposed in the filter chamber configured to separate contaminants from the processed fluid; and
a bypass pipe disposed in the bypass fluid flow path and configured to receive at least a second portion of the pre-processed fluid.

19. The fluid management system of claim 18, comprising a first outlet along the primary fluid flow path and a second outlet along the bypass fluid flow path.

20. The fluid management system of claim 19, wherein the at least a first portion of the pre-processed fluid exits through the first outlet, and the at least a second portion of the pre-processed fluid exits through the second outlet.

* * * * *